United States Patent [19]
Johnson et al.

[11] Patent Number: 5,648,897
[45] Date of Patent: Jul. 15, 1997

[54] SYSTEM FOR CONTROLLING A REMOTE UNIT

[75] Inventors: Darren Johnson; Jeffrey Baldwin; Maxson Eddy, all of Madison; Patrick Stogner, Huntsville, all of Ala.

[73] Assignee: Northrop Grumman Corporation, Los Angeles, Calif.

[21] Appl. No.: 687,281

[22] Filed: Jul. 25, 1996

Related U.S. Application Data

[63] Continuation of Ser. No. 231,725, Apr. 22, 1994, abandoned.
[51] Int. Cl.⁶ ............................................. G05B 9/02
[52] U.S. Cl. ............................ 364/188; 395/92; 395/94; 395/99
[58] Field of Search ............................ 364/188–190; 318/568.11, 568.12, 568.14, 568.2; 395/80, 82, 84, 88, 85, 92, 94; 901/2–16

[56] References Cited

U.S. PATENT DOCUMENTS

| | | | |
|---|---|---|---|
| 4,956,790 | 9/1990 | Tsuchihashi et al. | 364/188 |
| 5,008,804 | 4/1991 | Gordon et al. | 364/167.01 |
| 5,038,089 | 8/1991 | Szakaly | 395/84 |
| 5,047,700 | 9/1991 | Szakaly | 395/84 |
| 5,153,573 | 10/1992 | Spletter | 340/783 |

*Primary Examiner*—Paul P. Gordon
*Assistant Examiner*—Thomas E. Brown
*Attorney, Agent, or Firm*—Walter G. Sutcliff

[57] ABSTRACT

A control system having an operator control unit and a remote unit having a plurality of motors includes a control subsystem for controlling the operator control unit and the remote unit. A communication subsystem coupled to the control subsystem exchanges information between the operator control unit and the remote unit. A user input subsystem provides user commands to the control subsystem and an actuator subsystem controls the motors in the remote unit according control signals from the control subsystem. A sensor subsystem provides sensor information at the remote unit to the control subsystem and a display subsystem displays the information from the remote unit. A power supply unit provides power to the control system.

24 Claims, 20 Drawing Sheets

FIG.3
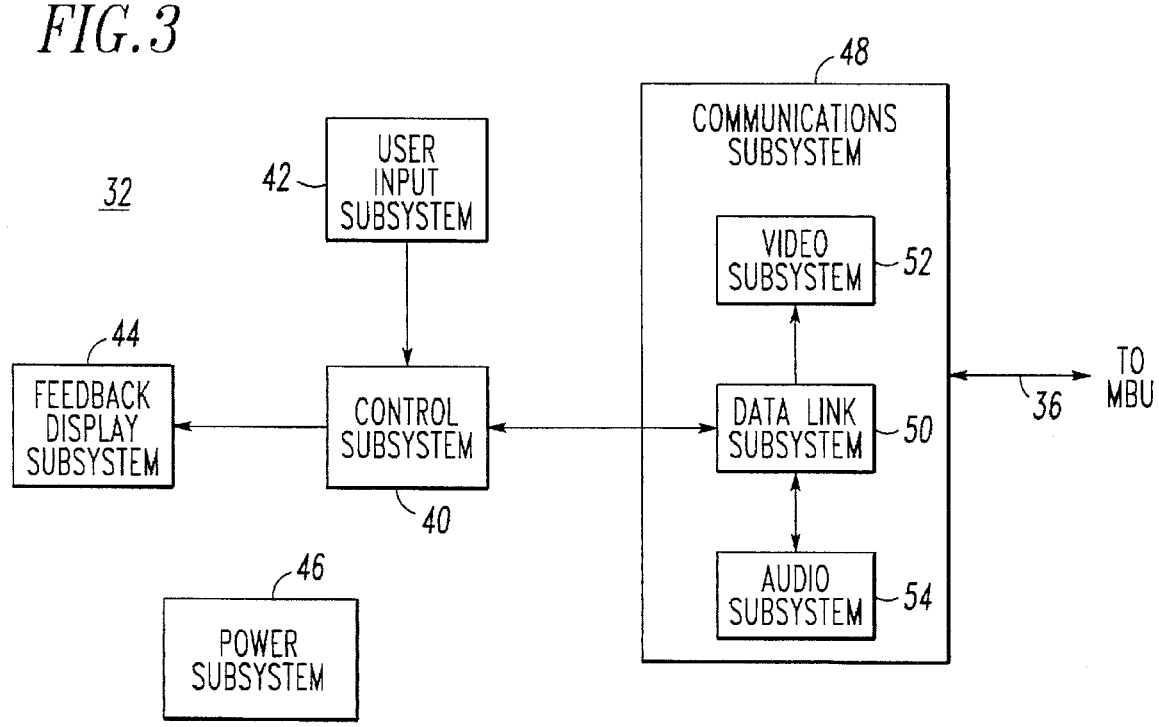
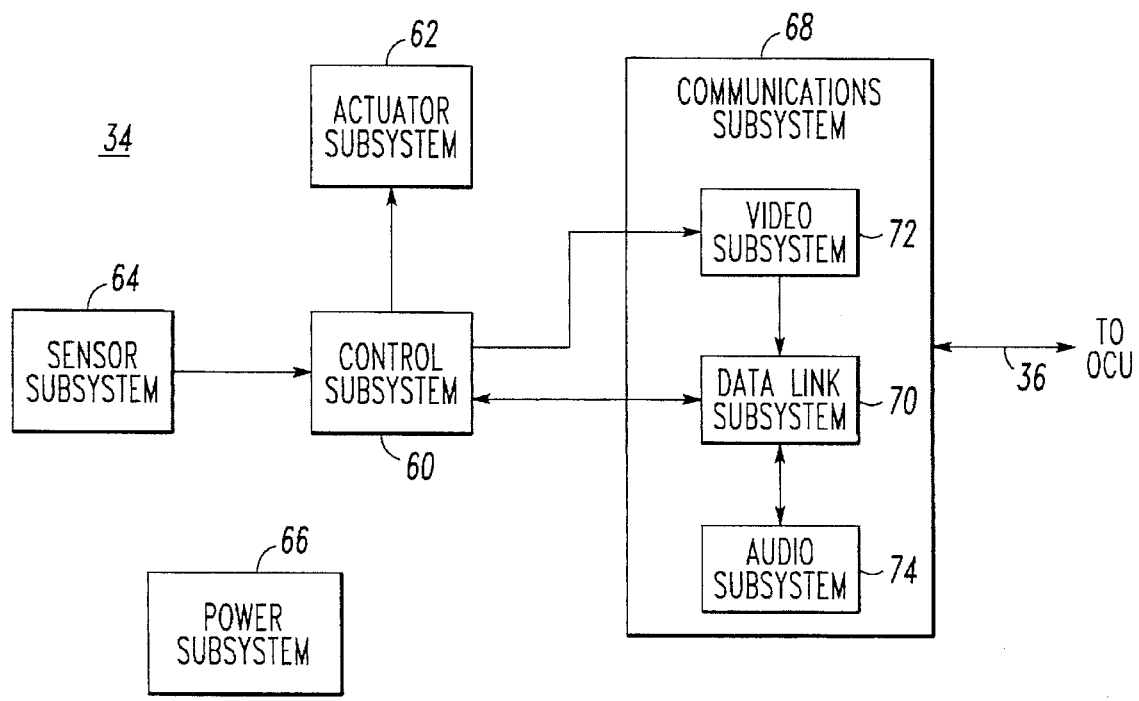
FIG.4

FIG. 14
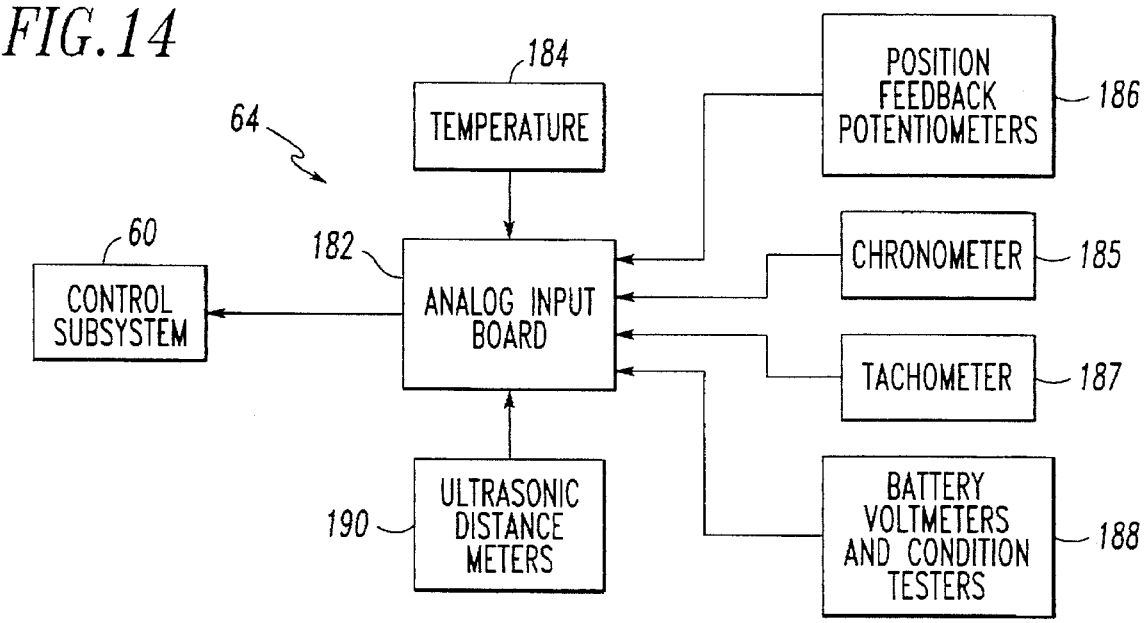
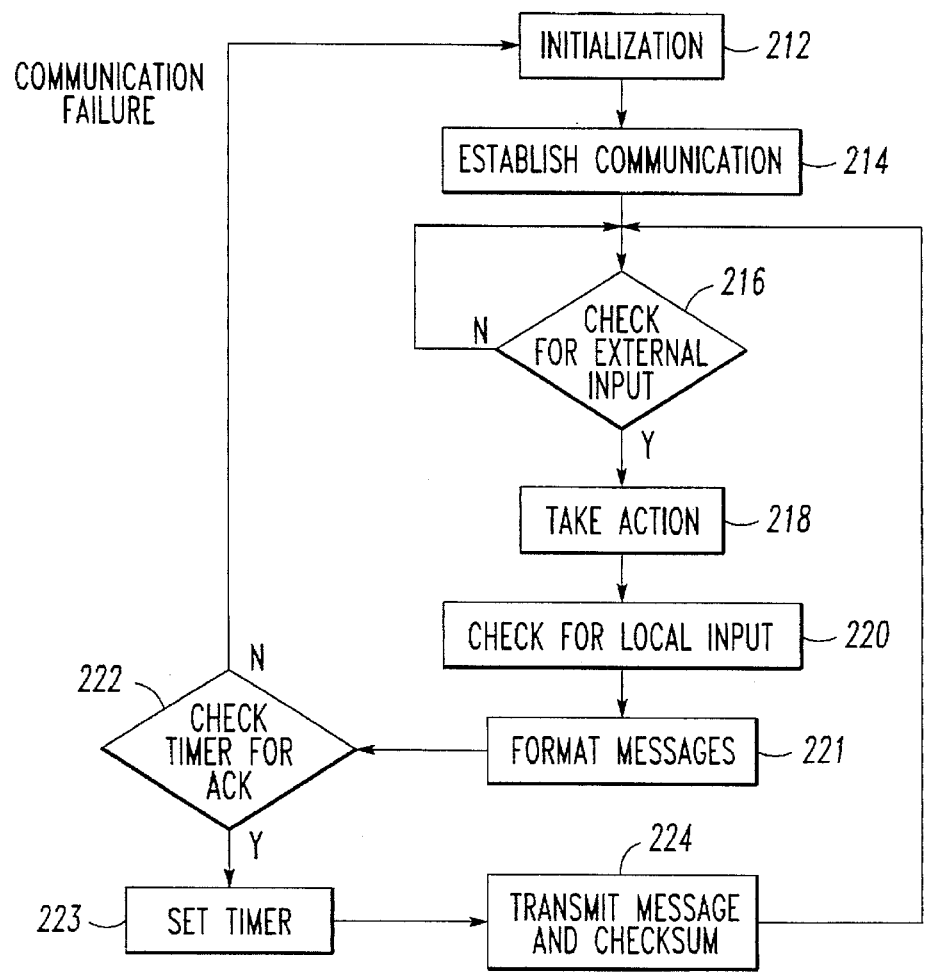
FIG. 16

1

SYSTEM FOR CONTROLLING A REMOTE UNIT

This is a continuation of application Ser. No. 08/231,725, filed Apr. 22, 1994, now abandoned.

BACKGROUND OF THE INVENTION

1. Field of the Invention

The present invention relates generally to a control system. More particularly, the present invention relates to a control system for controlling a remote unit. While the invention is subject to a wide range of applications, such as unmanned air, ground or sea vehicles as well as fixed systems, it is especially suited for use in controlling remote mobile ground vehicles.

2. Discussion of Related Art

Many remote control systems have been proposed in the past to control remote vehicle units. One such example is a control unit for controlling unmanned vehicles using video signals sent from the remote unit and sending control signals to the remote unit. Such remote control systems have a variety of applications including, for example, remote surveillance for military or security. Another example where remote control systems are applicable is in situations where an environment is too dangerous for human beings and a remote control vehicle with robotic functions may perform a required task.

Controllers in the conventional control systems use a fixed array of toggle switches for controls. This limits the controller to one type of vehicle, making modification and adaptations very difficult. The typical controller is large and bulky even when portrayed as "portable." A contributing factor to the large and bulky design is a large cathode ray tube (CRT) monitor requiring high battery power, which requires a physically large battery to meet the power ratings. Moreover, conventional controllers make it difficult for the operator to simultaneously control vehicle movement and on-board motor driven devices, such as a mechanical arm attached to the vehicle, for example.

In light of the foregoing, a control system is necessary that is truly portable, easy to operate, and easily reconfigurable to accommodate different types of vehicles.

SUMMARY OF THE INVENTION

Accordingly, the present invention is directed to a system for controlling a remote vehicle that substantially obviates one or more of the problems due to limitations and disadvantages of the prior art.

One advantage of the present invention is the provision of a control system that integrates all functions required to monitor and control a remote unit in one truly portable package.

Another advantage of the present invention is the provision of a control system that is compact, expandable, and easily adaptable to control many different remote units.

The features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve these and other advantages, and in accordance with the purpose of the invention, as embodied and broadly described, a control system including an operator control unit and a remote unit having a plurality of motors, comprises a control subsystem for controlling the operator control unit and the remote unit; a communication subsystem coupled to the control subsystem for exchanging information between the operator control unit and the remote unit; a user input subsystem for providing user commands to the control subsystem; an actuator subsystem for controlling the motors in the remote unit according control signals from the control subsystem; a sensor subsystem for providing sensor information at the remote unit to the control subsystem; a display subsystem for displaying the information from the remote unit; and a power supply unit for providing power to the control system.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention, and together with the description serve to explain the principles of the invention.

BRIEF DESCRIPTION OF THE DRAWINGS

In the drawings,

FIG. 3 is a block diagram of the control unit of the control system in FIG. 1;

FIG. 4 is a block diagram of the mobile base unit of the control system in FIG. 1;

FIG. 14 is a schematic block diagram of a sensor subsystem of the mobile base unit in FIG. 4;

FIG. 16 is a flowchart of the operation of the control system in FIG. 1;

DETAILED DESCRIPTION OF THE PREFERRED EMBODIMENTS

Reference will now be made in detail to the present preferred embodiment of the invention, an example of which is illustrated in the accompanying drawings.

Figure 1:
FIG. 1 is a general block diagram of a control system including a control unit and a mobile base unit of the present invention.

As shown in FIG. 1, there is provided a control system 30 including an operator control unit (OCU) 32, a mobile base unit (MBU) 34, and communications data link 36. The mobile base unit 34 is a remote unit.

Figure 2:
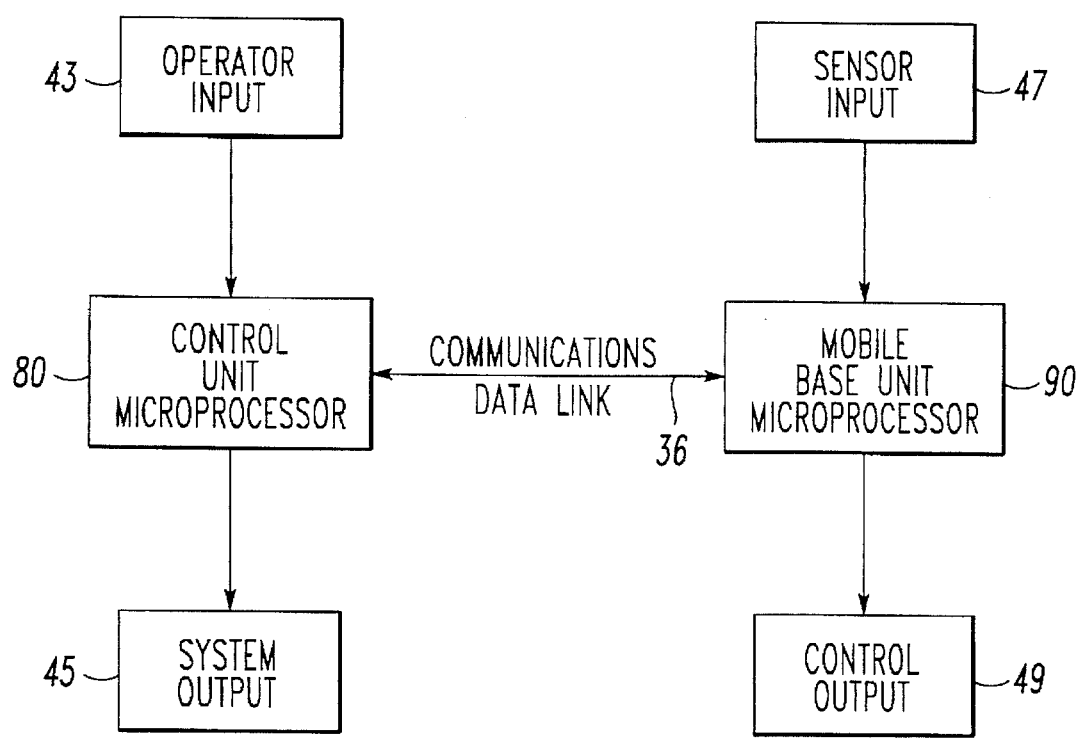
FIG. 2 is a more detailed block diagram of the control system in FIG. 1.

As shown in FIG. 2, the OCU 32 includes microprocessor 80 which receives operator commands from operator input 43 and sends the commands to microprocessor 90 at the MBU 34 through the communications data link 36. The MBU microprocessor 90 produces corresponding commands to the control output 49. The MBU microprocessor 90 receives information from the sensor input 47 and sends this sense information to the OCU microprocessor 80 which produces corresponding output to the system output 45.

As embodied herein and referring to FIG. 3, the operator control unit (OCU) 32 includes a control subsystem 40, user input subsystem 42, feedback display subsystem 44, power subsystem 46, and communication subsystem 48. As embodied herein in FIG. 4, the mobile base unit (MBU) 34 includes a control subsystem 60, actuator subsystem 62, sensor subsystem 64, power subsystem 66, and communication subsystem 68. The OCU 32 and the MBU 34 are connected to each other by a communication data link 36 through the communication subsystems 48 and 68.

The control system of the present invention includes a control subsystem for controlling an operator control unit and a remote unit, the remote unit having a plurality of motors. The control subsystem is divided into two control subsystems—a first (OCU) control subsystem and a second (remote) control subsystem. The first control unit controls the OCU and the second control unit controls the remote unit.

Figure 5:
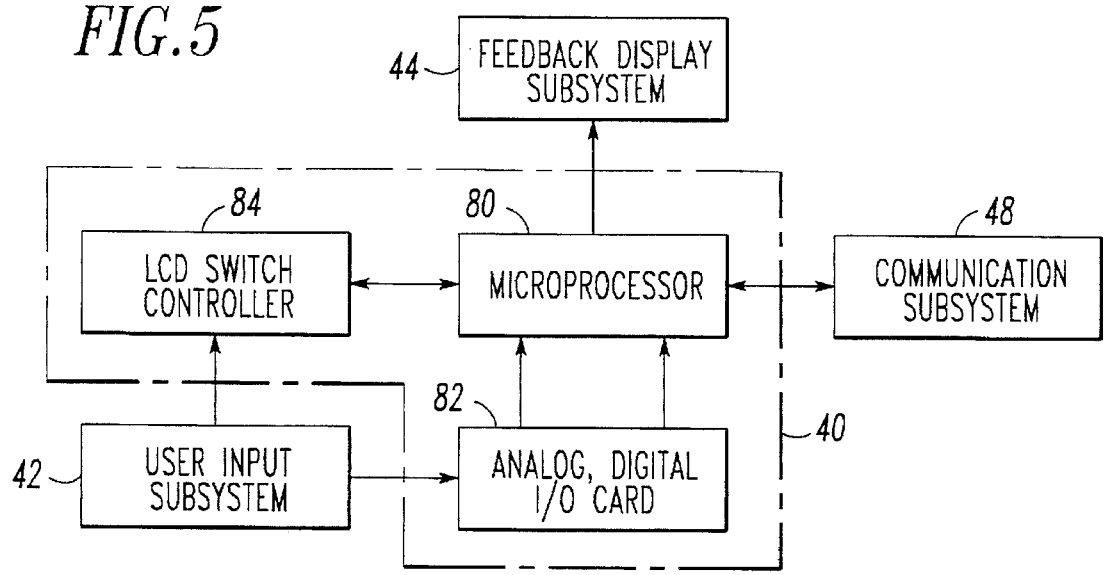
FIG. 5 is a schematic block diagram of a control subsystem of the control unit in FIG. 3.

As embodied herein and as shown in FIG. 3, the operator control unit 32 includes a control subsystem 40 which controls the functions of the OCU 32. As shown in FIG. 5, the control subsystem 40 includes a microprocessor 80, analog input/output (I/O) and digital input/output (I/O) unit 82 and a liquid crystal display (LCD) switch controller 84. The microprocessor 80, such as the INTEL 80386 or other comparable microprocessor, receives commands from the user input subsystem 42 through the LCD switch controller 84. The LCD switch controller 84 is an intelligent switch controller (such as the Itochu Technology, Incorporated DC801). The microprocessor 80 also receives commands from the user input subsystem 42 through the analog I/O (such as an A/D converter) and digital I/O unit 82. The microprocessor 80 transmits and receives information with the MBU 34 through the communication subsystem 48. Also, the microprocessor 80 sends status and other video data from the MBU 34 to a feedback display subsystem 44.

The control system of the present invention includes a communication subsystem coupled to the control subsystem for exchanging information between the operator control unit and the remote unit. The communication subsystem is also divided into an OCU communication unit and a remote communication unit. The OCU communication unit corresponds to the first (OCU) control unit and the remote communication unit corresponds to the second (remote) control unit.

As shown in FIG. 3, the communication subsystem 48, which includes a data link subsystem 50, a video subsystem 52 and an audio subsystem 54, connects the control subsystem 40 in the OCU 32 to the MBU 34. The data link subsystem 50 transmits data received from the MBU 34 to the control subsystem 40 as well as to the video subsystem 52 and audio subsystem 54.

Figure 6:
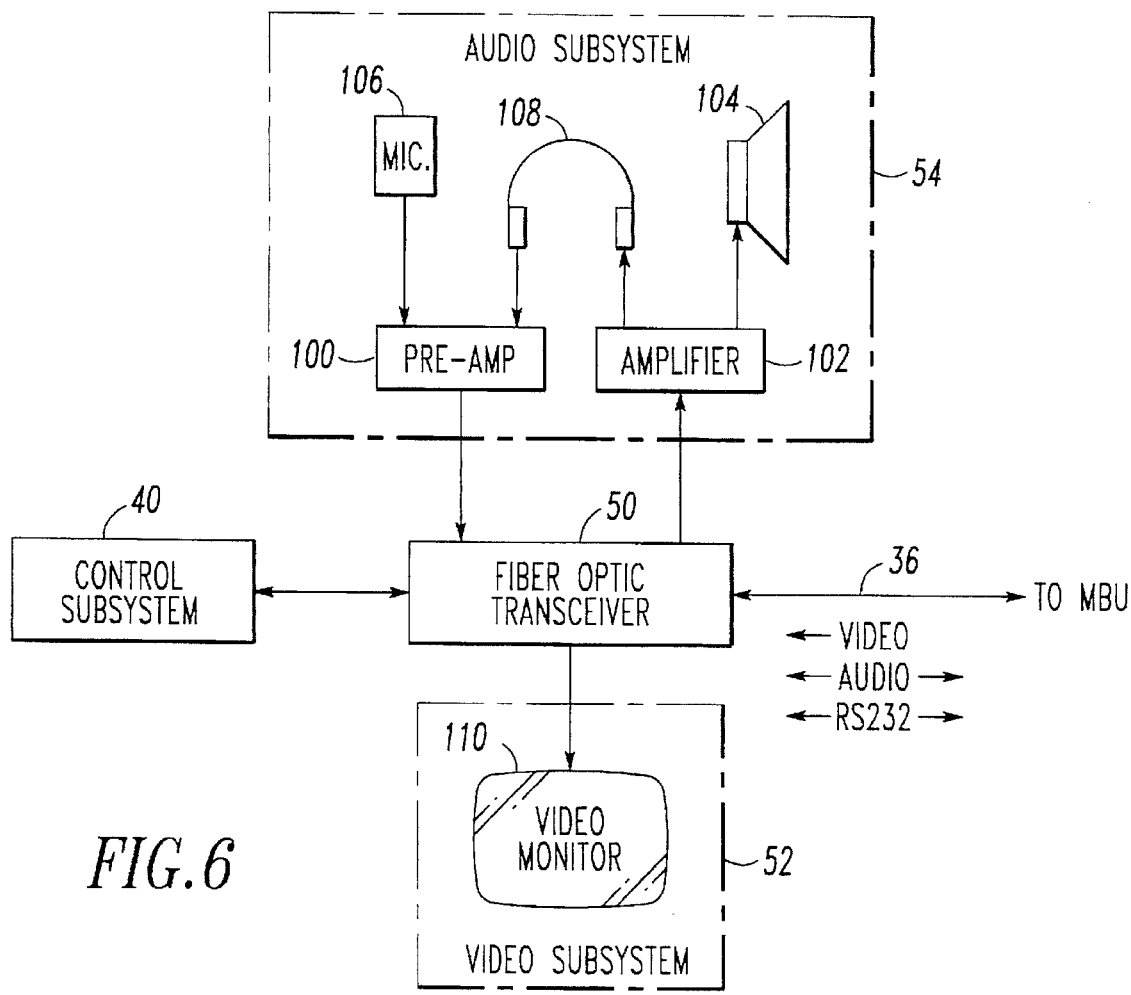
FIG. 6 is a schematic block diagram of a communication subsystem of the control unit in FIG. 3.

As shown in FIG. 6, the data link 50 is preferably a fiber optic transceiver including a fiber optic receiver and a fiber optic transmitter such as from Fiber Options, Incorporated part numbers 2246D-R and 2246D-T, respectively. However, other comparable transceivers may be used as well as other types of transceivers such as a radio frequency (RF) transceiver or a hardwire (coax, for example) transceiver.

The video subsystem 52 receives video signals from the MBU 34 through the fiber optic transceiver 50 and displays the corresponding images on the video monitor 110. The video monitor is preferably a color, thin-film transistor, liquid crystal display (LCD) monitor (such as Sharp 9M-60U) requiring low power to permit the OCU 32 to be light weight and portable (preferably less than 5 pounds). A battery weighing less than six pounds can power the LCD monitor, which also contributes to the light weight and portability.

The audio subsystem 54 includes a preamplifier 100, an amplifier 102, a speaker 104, a microphone 106 and a headset 108. The amplifier 102 receives audio signals from the MBU 34 through the fiber optic transceiver 50 and amplifies the signals to the speaker 104 and/or to the headset 108. The microphone 106 and/or the headset 108 send audio signals to the preamplifier 100 which preamplifies and transmits the audio signals to the MBU 34 through the fiber optic transceiver 50.

The control system of the present invention includes a user input subsystem for providing user commands to the control subsystem.

Figure 7:
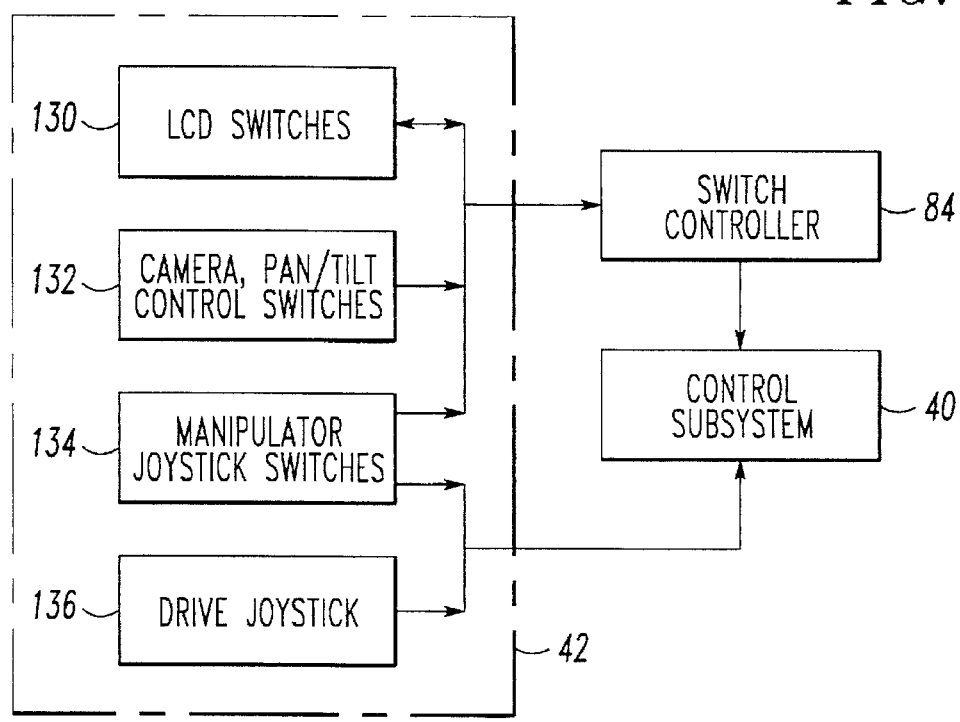
FIG. 7 is a schematic block diagram of a user input subsystem of the control unit in FIG. 3.

As shown in FIG. 3, the user input subsystem 42 transmits command signals from the user to the control subsystem 40, which is ultimately sent to the MBU 34 through the communication subsystem 48. The user input subsystem 42 is shown in detail in FIG. 7. As shown in FIG. 7, the user input subsystem 42 includes LCD switches 130, camera and pan/tilt control switches 132, manipulator joystick 134a and manipulator switches 134b (both labelled as 134), and drive joystick 136. The LCD switches 130, the camera and pan/tilt control switches 132 and the manipulator switches 134b are connected to the control subsystem 40 through the switch controller 84. The manipulator joystick 134a and drive joystick 136 are directly connected to the control subsystem 40. The manipulator switches 134b are control buttons located on the joystick itself. The manipulator switches 134b, when activated, control the claws and grippers on a manipulator arm on the MBU 34, for example.

The manipulator joystick 134 controls motors such as those relating to an arm or other movable device on the mobile base unit 34. The manipulator joystick 134 is a single multi-function joystick for controlling a manipulator such as a robotic arm or other auxiliary equipment. This allows a simple, one-handed operation of the manipulator. The drive joystick 136 controls the drive motors on the MBU 34. Preferably, the drive joystick 136 is a proportional control joystick in which the speed of the vehicle is proportional to the force on the joystick. For example, to go faster in the forward direction (of the vehicle), the operator would force the joystick 136 further to the forward direction, or to go faster in the left direction, the operator would force the joystick 136 to the left. In other words, moving the drive joystick 136 slightly in a direction, results in a slow speed of the vehicle in that direction, whereas moving the joystick 136 further in the direction, results in a faster speed of the vehicle.

Figure 18:
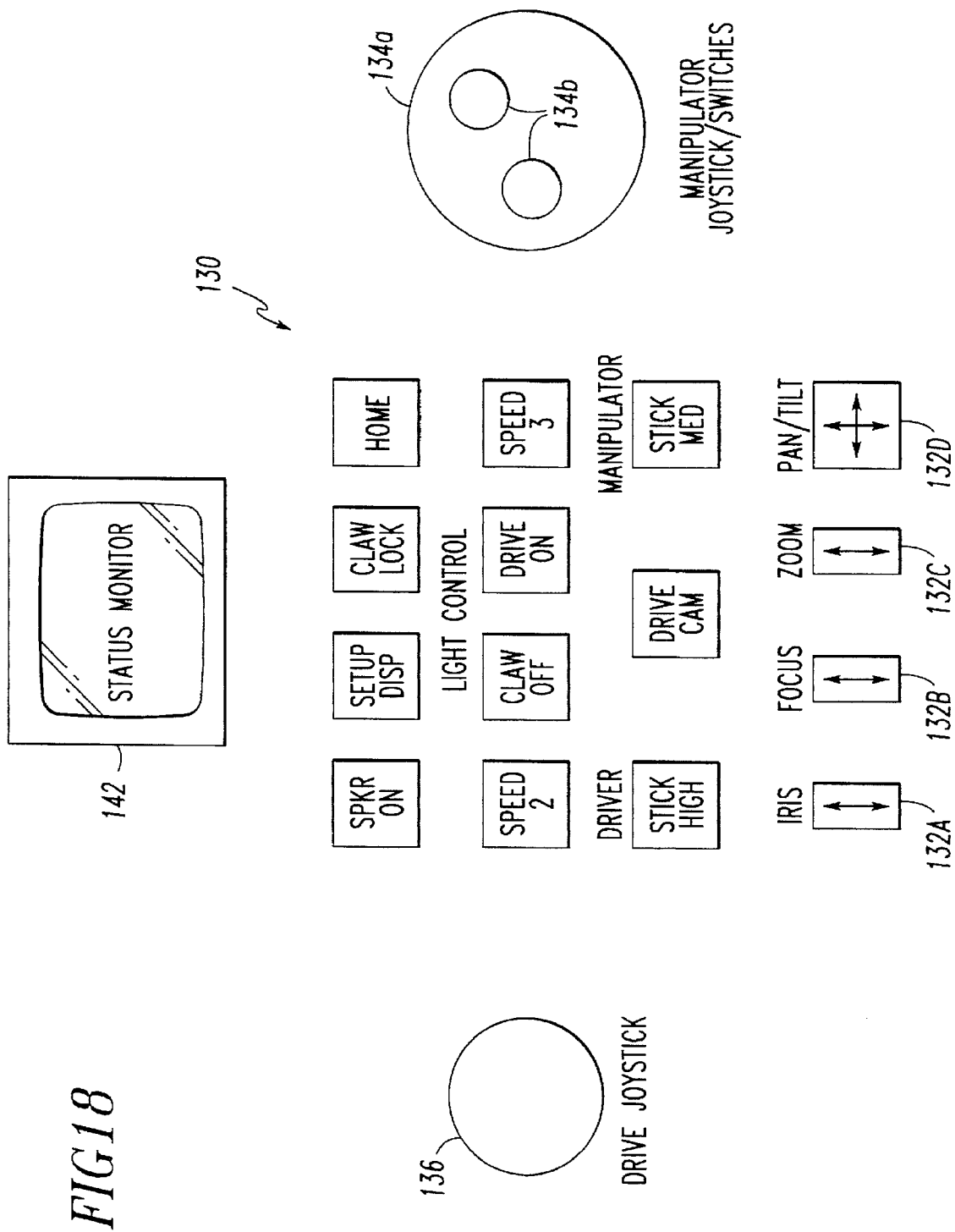
FIG. 18 is an exemplary illustration of LCD switches on the operator control unit.

Moreover, the range of speed can be altered using the driver speed switch in the LCD switches 130 (FIG. 18). For example, if four speed ranges are set (range #1 being the slowest and #4 being the fastest), then maximum and minimum speeds achievable are limited to the selected range. Accordingly, the drive joystick 136 allows a simple, one-handed operation of controlling the vehicle.

As shown in FIG. 18, labels for each of the LCD switches 130 are shown in a small LCD display having a 24×36 pixel configuration, for example. The switches 130, in conjunction with the microprocessor 80, are reconfigurable to provide different functions. Accordingly, by modifying only software, each switch 130 can display different legends and control different devices. For example, FIG. 18 shows "SPKR ON" (turns on the speaker 118 at the MBU 34), "SETUP DISP" (changes the LCD switch legend to display a different menu), "CLAW LOCK" (locks the current position of a claw attached to an arm on the MBU 34), "HOME" (resets the switches to a default setting), "SPEED 2" (sets a speed range for the drive motor), "CLAW OFF" (turns off the lights attached to the claw), "DRIVE ON" (turns on the lights on the MBU 34 for driving), "SPEED 3" (sets a speed range for a motor driven device such as the arm on the MBU 34), "STICK HIGH" (sets a sensitivity for the drive joystick 136), "DRIVE CAM" (selects a camera for the LCD monitor 110), and "STICK MED" (sets a sensitivity for the manipulator joystick 134). Accordingly, within a particular application, the LCD switches 130 can display "context sensitive" legends, allowing each switch to control multiple functions.

The camera and pan/tilt control switches 132 of FIG. 18 includes switch 132A which controls the iris of the camera (open and close), switch 132B which controls the camera focus (in and out), switch 132C which controls camera zoom functions (in and out), and switch 132D which controls the Pan and tilt to move the camera at the mobile base unit 34 to desired positions (up, down, left and right).

The LCD switches 130, camera and pan/tilt switches 132 (132A, 132B, 132C and 132D), and the manipulator switches 134b send their signals to the switch controller 84. The switch controller 84 sends an appropriate switch signal to the control subsystem 40.

Figure 8:
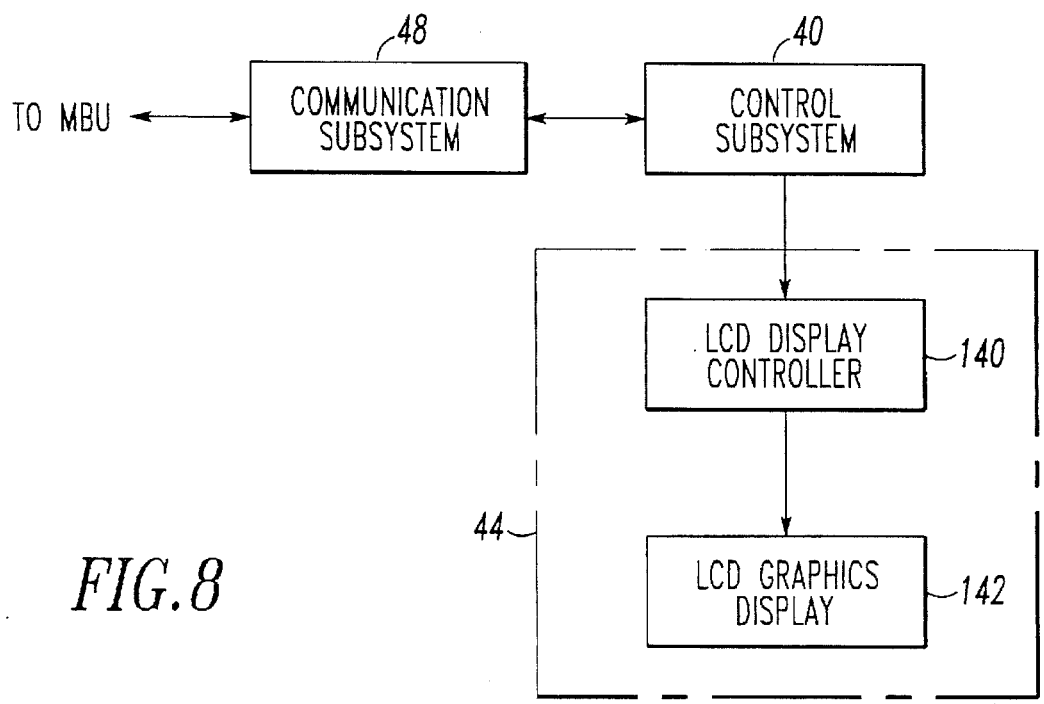
FIG. 8 is a schematic block diagram of a feedback display subsystem of the control unit in FIG. 3.

The control system of the present invention includes a display subsystem for displaying the information from the remote unit. As shown in FIG. 3, the feedback display subsystem 44 receives status information from the MBU 34 through the control subsystem 40. Referring to FIG. 8, the feedback display subsystem 44 includes an LCD display controller 140 and an LCD graphics display 142. The control subsystem 40 sends status information to the LCD graphics display 142 (such as Densitron LMG50B200G320DSY2) through the LCD display controller 140 (such as Densitron PCX10).

Figure 9:
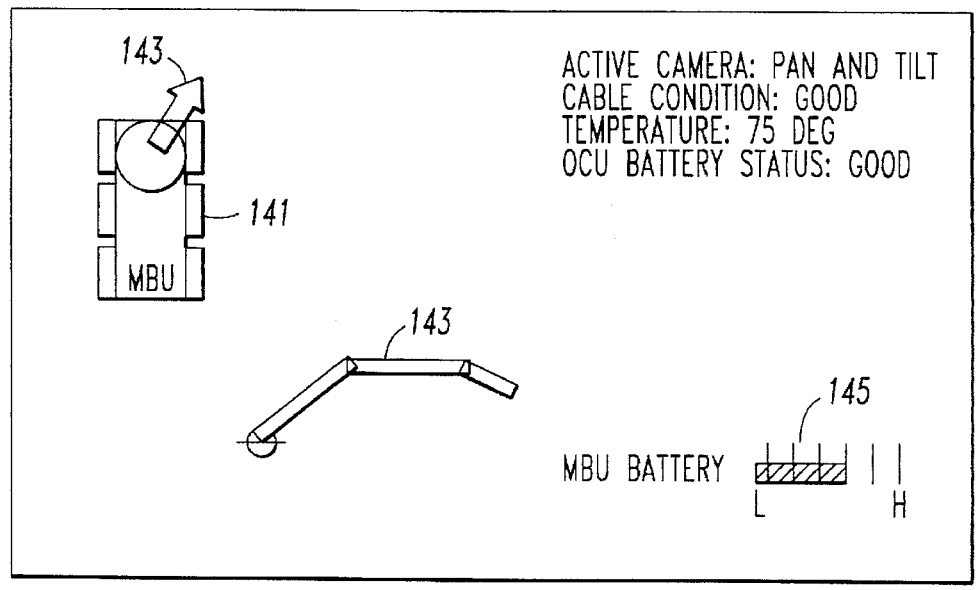
FIG. 9 shows a sample screen from the feedback display subsystem in FIG. 8.
Figure 17:
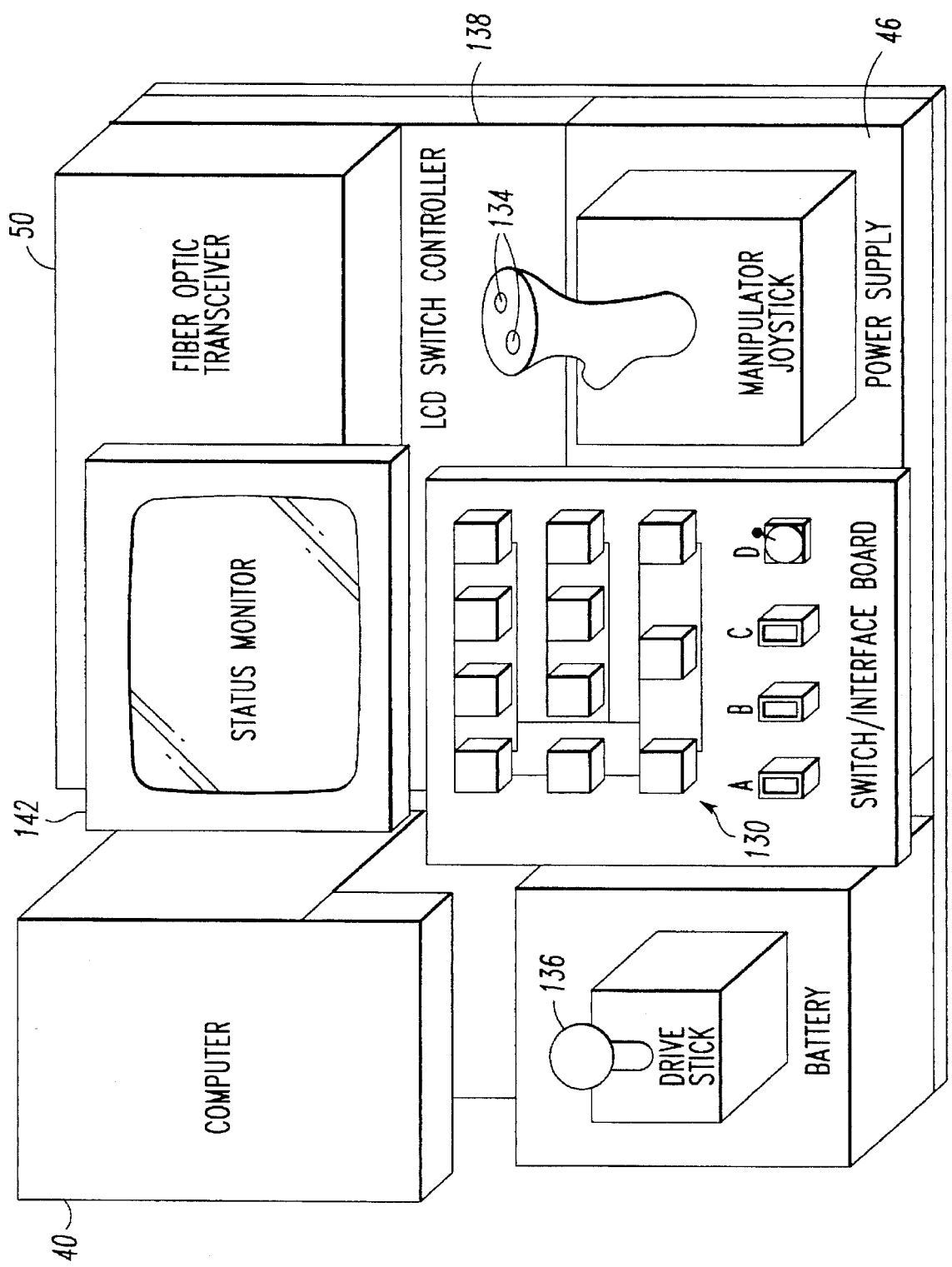
FIG. 17 is an exemplary illustration of an operator control unit packaging.

FIG. 9 shows an example of the status information displayed on the LCD graphics display 42, which is essentially a status monitor (see FIG. 17 or 18, label 142). The status information includes, for example, the position of an arm on the MBU 34 (label 141), the relative angular position of the shoulder, elbow and wrist of the arm (label 143), MBU battery status (label 145), and other relevant status information such as active camera (the camera being viewed), cable condition, temperature, and OCU battery status. Additional status information will be discussed with reference to the sensor subsystem 64 on the MBU 34.

The control subsystem includes a second control unit to control the remote unit.

Figure 11:
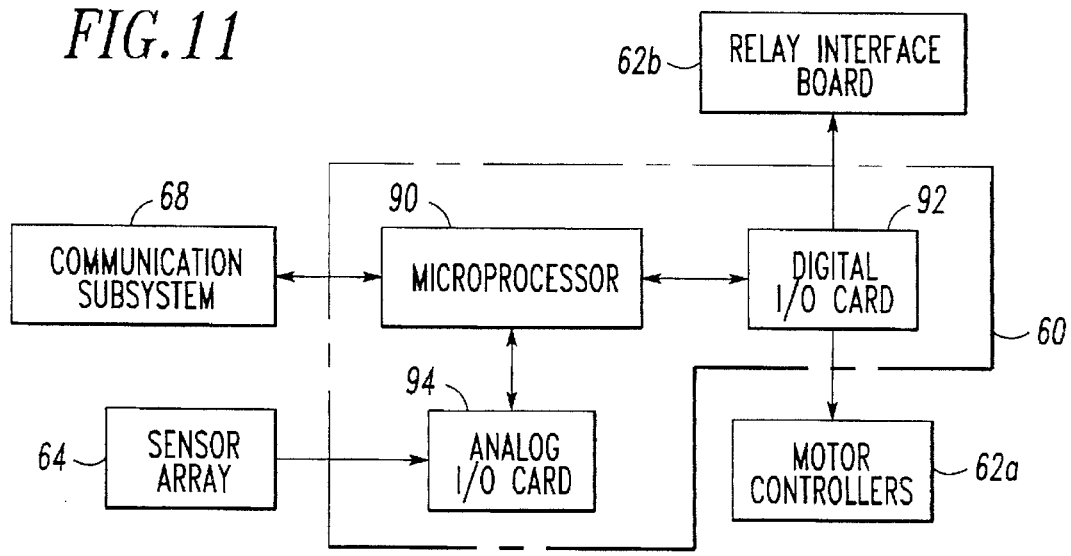
FIG. 11 is a schematic block diagram of a control subsystem of the mobile base unit in FIG. 4.

As shown in FIG. 4, the mobile base unit 34 includes a control subsystem 60 which controls the functions of the MBU 34. As shown in FIG. 11, the control subsystem 60 includes a microprocessor 90, a digital input/output card 92, and an analog input/output card 94. The microprocessor 90, such as the INTEL 80386 or other comparable microprocessor, receives commands from the operator control unit through communication subsystem 68. The microprocessor 90 receives sensor information from the sensor array 64 through the analog I/O card 94. The microprocessor 90 sends corresponding command signals to actuator subsystem 62, which includes motor controllers 62a and relay interface board 62b. Conventional parts may be used for the digital I/O card 92 and analog I/O card 94 such as Octagon Systems 2536 and 3157, respectively.

In particular, the control subsystem (computer) 60 includes a CPU card, one or more input/output cards, and a backplane, which is powered by +5 volt. One option for the CPU card is an Octagon Systems 5025PC. This card includes, for example, a 25 MHz INTEL 80386 microprocessor, 1 MB RAM, 256K flash EPROM for program storage, 128K ROM containing BIOS and DOS, two serial RS-232 ports, and one parallel port. Although the 1 MB RAM, 256K flash EPROM for program storage, 128K ROM containing BIOS and DOS, two serial RS-232 ports, and one parallel port are not shown in FIG. 11, it should be understood that these devices are included in the control subsystem 60 in the MBU 34 as well as in the control subsystem 40 in the OCU 32. The digital input/output card 92 and analog input/output card 94 interface with the motor controllers in the actuator subsystem 62 and sensor subsystem 64, respectively.

The control system of the present invention includes a remote communication unit to transmit and receive information to and from the OCU.

As shown in FIG. 4, the communication subsystem 68 of the MBU 34 includes a data link subsystem 70, a video subsystem 72, and an audio subsystem 74. The communication subsystem 68 is connected to the control subsystem 60 through the data link subsystem 70 to provide data transmission to and from the OCU 32. The control subsystem 60 is also connected to the video subsystem 72.

Figure 12:
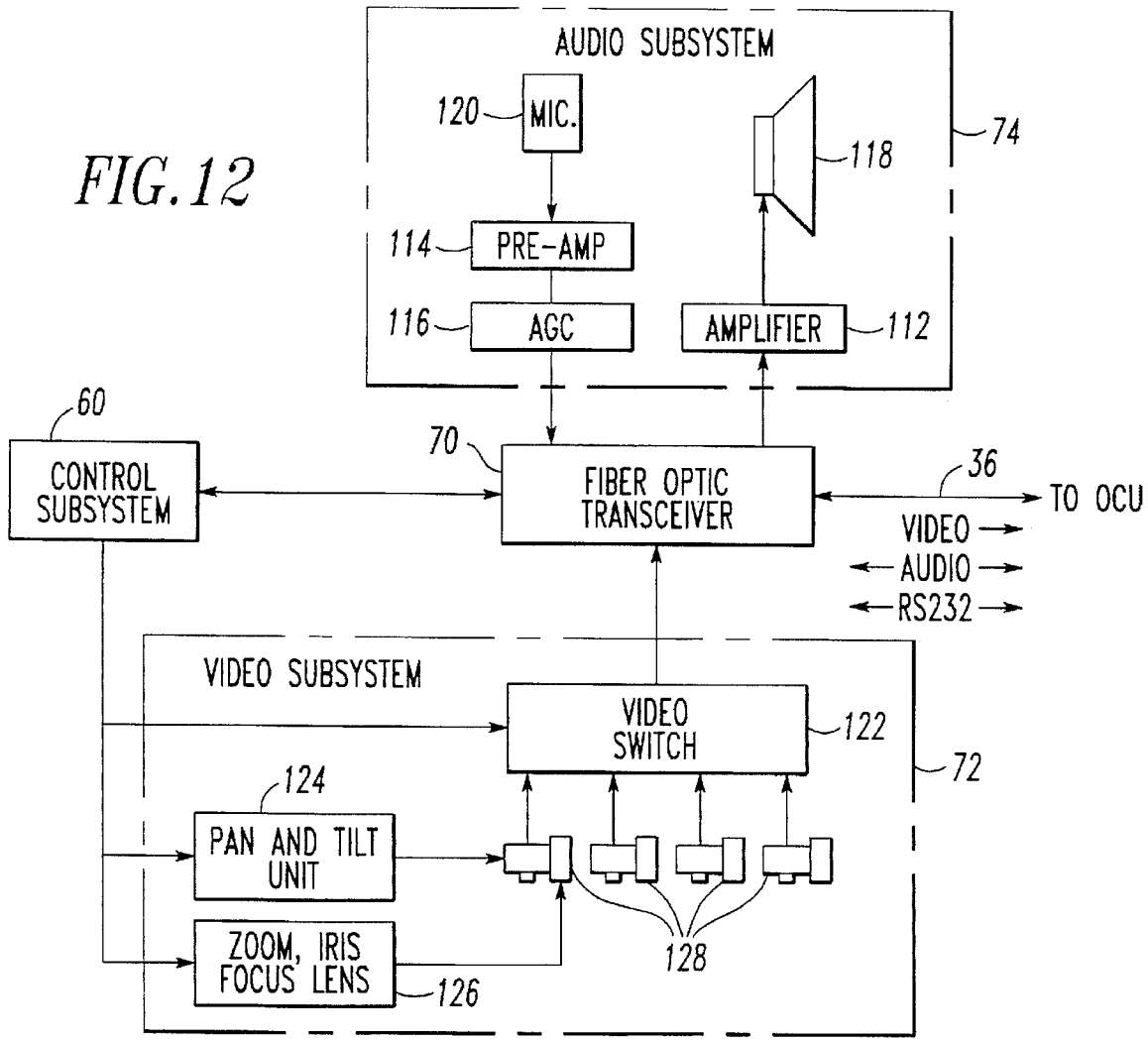
FIG. 12 is a schematic block diagram of a communication subsystem of the mobile base unit in FIG. 4.

As shown in FIG. 12, the data link subsystem 70 is shown preferably as a fiber optic transceiver including a fiber optic receiver and a fiber optic transmitter such as from Fiber Options, Incorporated part numbers 2246D-R and 2246D-T, respectively, similar to the fiber optic transceiver 50 in the OCU 32. As with the fiber optic transceiver 50 in the OCU 32, other comparable transceivers may be used as well as other types such as a radio frequency (RF) transceiver or a hardwire (coax, for example) transceiver. The fiber optic transceiver 70 at the MBU 34 is connected to the fiber optic transceiver 50 at the OCU 32 through the fiber optic cable 36. The transceivers 50 and 70 exchange signals including video, audio, and RS-232 (serial data), for example, between the OCU 32 and MBU 34.

The fiber optic transceiver 70 transmits video, audio, and serial data, and receives audio and serial data on one fiber, utilizing a +12 volt DC supply. The fiber optic interface can be replaced by an RF communications link, for example. Serial data link is best accomplished via one of the serial RS-232 ports in the computer 60. The fiber optic transceiver 70 in the MBU 34 is similar to the fiber optic transceiver 50 in the OCU 32.

The video subsystem 72 includes a video switch 122, a pan and tilt unit 124, a unit 126 for adjusting zoom, iris and focus, and cameras 128. The cameras 128 provide video signals to the fiber optic transceiver 70 through the video switch 122 which selects a video signal corresponding to one of the cameras 128. The video switch 122 (such as Consolidated Media Systems FSR EV4) receives commands (such as camera selection) from the OCU 32 through the control subsystem 60. At least one of the cameras 128 are attached to the pan and tilt unit 124 and its camera functions are controlled by the unit 126 through switches 132A, 132B, 132C and 132D in the OCU 32 (see FIG. 18). When the operator selects one of the cameras using the camera switch in the LCD switches 130 (FIG. 18), the video switch 122 selects a video signal from one of the cameras 128 which will display a video image from the selected camera at the LCD video monitor 110 (see FIG. 6). The video subsystem 72 may be easily modified to support split screening to display multiple camera video signals or multiple monitors corresponding to the multiple cameras.

The video subsystem 72 preferably includes three color video cameras 128, one black and white camera 128, video switch 122, pan/tilt unit 124 and camera control (zoom, iris, focus) unit 126. The camera control unit 126 and the pan/tilt unit 124 are controlled through a relay board 158 activated by the digital I/O card 92 (see FIG. 13). The video from the four cameras is routed through a 4-to-1 video switch 122, which is controlled directly by the digital I/O card 92. The video is then transmitted through the communications transceiver 70 to the OCU 32.

The audio subsystem 74 includes an amplifier 112, a preamplifier 114, an automatic gain controller (AGC) 116, a speaker 118, and a microphone 120. The amplifier 112 receives audio signals from the OCU 32 through the fiber optic transceiver 70 and amplifies the signals to the speaker 118. The microphone 120 sends audio signals at the MBU 34 to the preamplifier 114 and AGC 116 which preamplifies and adjust the gain on the audio signal. The processed audio signal is transmitted to the OCU 32 through the fiber optic transceiver 70.

Components of the audio subsystem 74 are vehicle dependent, but can be as simple as microphone 120 and loudspeaker 118. For example, a microphone 120 may not be suitable for an unmanned air vehicle due to the high noise from the vehicle itself. The present invention is compatible with any audio subsystem and can also utilize an automatic gain control (AGC) circuitry 116 to protect the operator listening to the audio signals and to enhance system performance.

One of the advantages of the audio subsystems 54 (OCU) and 74 (MBU) is that the user operating OCU 32 can hear sounds surrounding the MBU 34 including sounds from the motors on the MBU 34, which may indicate the condition of the motors, for example. Another advantage is that the user at the OCU 32 can use the audio subsystem 74 on the MBU 34 as a loud speaker to communicate with anyone within the listening range of the MBU 34.

The control system of the present invention includes an actuator subsystem for controlling the motors in the remote unit according to control signals from the control subsystem of the operator control unit.

Figure 13:
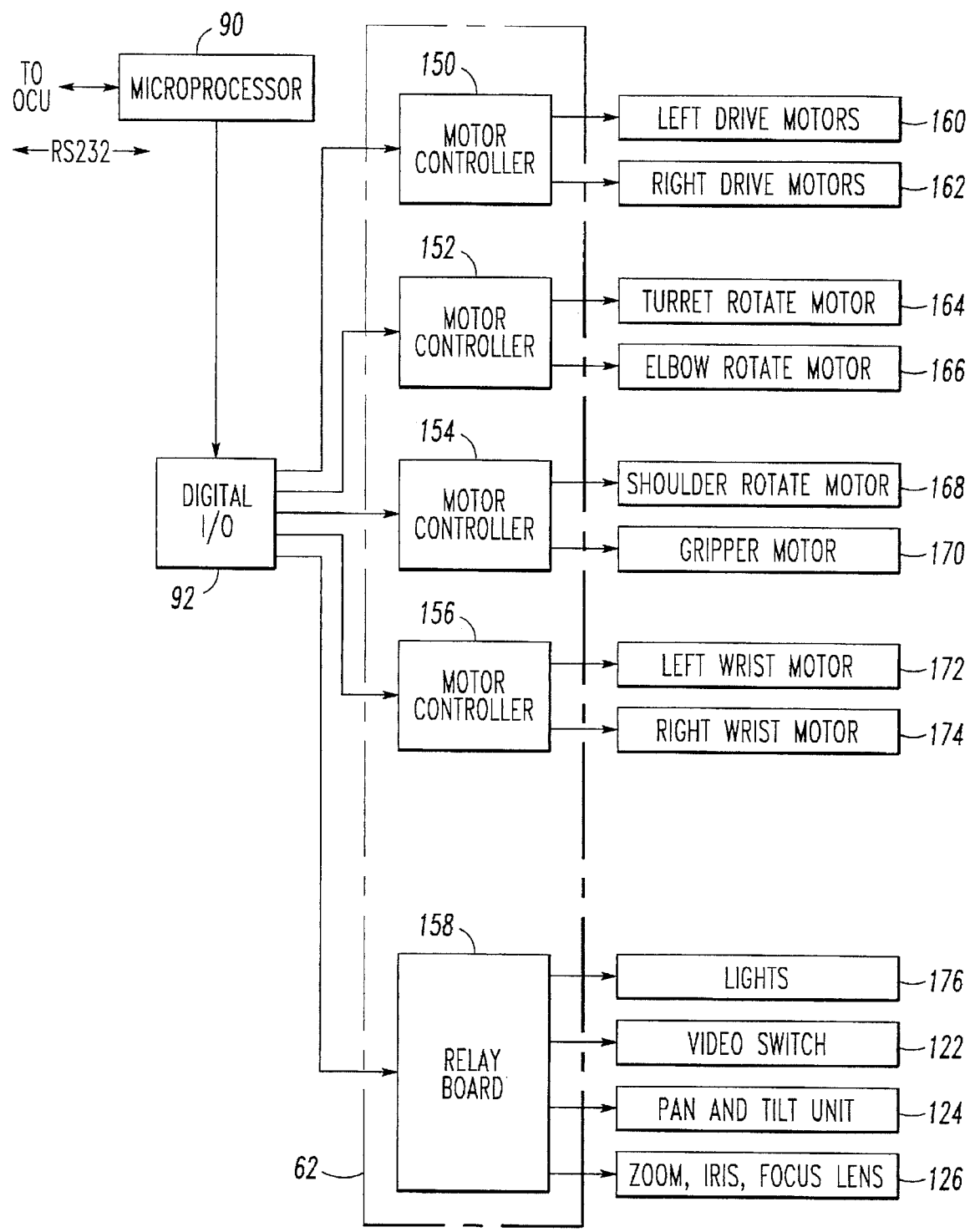
FIG. 13 is a schematic block diagram of an actuator subsystem of the mobile base unit in FIG. 4.

As shown in FIG. 4, the actuator subsystem 62 is connected to the control subsystem 60 of the MBU 34. The control subsystem 60 sends commands from the OCU 32 to the actuator subsystem 62. As shown in FIG. 13, the actuator subsystem 62 includes four motor controllers 150, 152, 154 and 156 and a relay board 158. The motor controllers (such as VANTEC's CDFR series motor controllers) and relay board 158 receive commands from the microprocessor 90 through the digital I/O 92. The motor controller 150 controls left drive motors 160 and right drive motors 162 to drive the MBU 34. The motor controller 152 controls a turret rotate motor 64 and an elbow rotate motor 166. The motor controller 154 controls a shoulder rotate motor 168 and a gripper motor 170. The motor controller 156 controls a left wrist motor 172 and a right wrist motor 174. Accordingly, the motor controller 150 powers the MBU 34 to have mobility and the other motor controllers provide robotic functions to perform tasks. Additional motor controllers may be installed, and the motor controllers may control other motor driven devices for different functions, as needed.

The relay board 158 is connected to devices such as lights 176, video switch 122, pan and tilt unit 124, and camera control unit 126. The relay board 158 activates appropriate devices according to the commands from the OCU 32. Again, additional devices may be installed or may replace the present devices, as needed, to provide the desired functionality.

The drive motors (160 and 162) and the manipulator control motors (164, 166, 168, 170, 172 and 174) can be controlled through standard motor controllers. The motor controllers (150, 152, 154 and 156) interface to the computer 60 through the digital I/O card 92, and provide pulse width modulation (PWM) power control to the motors based on commands input from the OCU 32.

The control system of the present invention includes a sensor subsystem for providing sensor information at the remote unit to the operator control unit.

As shown in FIG. 4, the sensor subsystem 64 is connected to the control subsystem 60 of the MBU 34 to provide information regarding various sensors available in the MBU 34. As shown in FIG. 14, the sensor subsystem 64 includes an analog input board 182 and various sensors. Ultrasonic distance meter 190 measures the distance between an object and the MBU 34. Battery voltmeters and condition testers 188 provide battery power and condition status to the operator. Position feedback potentiometers 186 provide present position of the arm (see 143 in FIG. 9), for example, in the MBU 34. Thermometer 184 senses the temperature at the MBU 34 or at any other place where the temperature may be measured. A chronometer 185 may measure the pitch and roll of the MBU 34. A tachometer 187 positioned at the wheels of the MBU 34 can measure the speed. Other sensors can be added, as needed.

The analog input board 182, including an analog input card (such as Octagon Systems 3258), receives analog signals corresponding to the sensors and digitizes the signals before sending the sensor signals to the control subsystem 60 and subsequently to the OCU 32.

The control system of the present invention includes a power subsystem for providing power to the control system.

The power subsystem includes a first power supply unit to power the OCU and a second power supply unit to power the remote unit.

Figure 10:
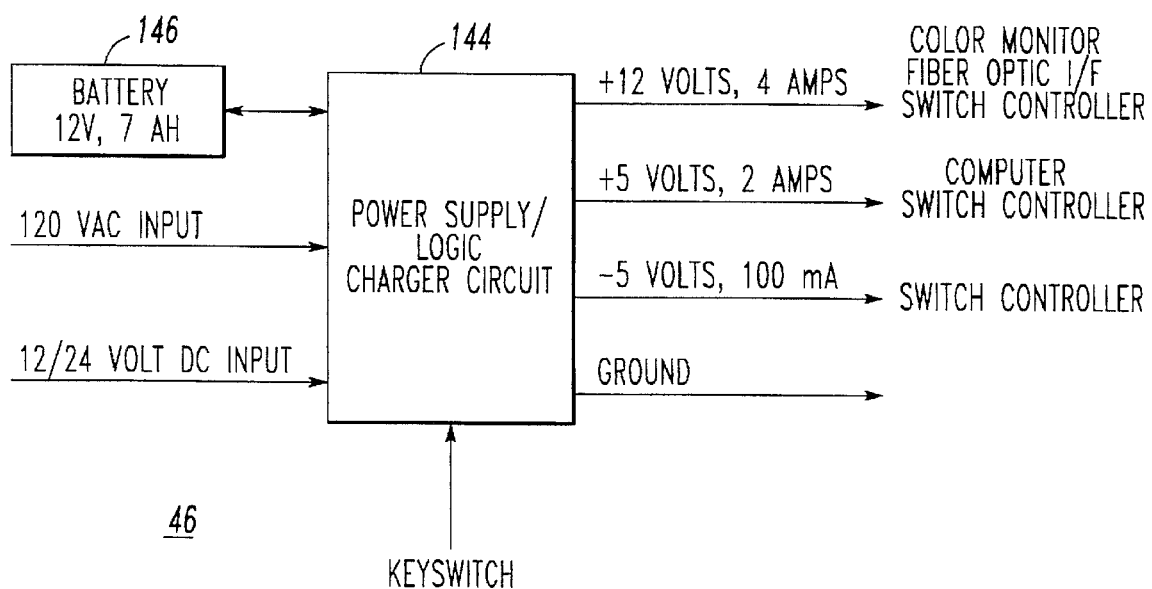
FIG. 10 is a schematic block diagram of a power supply unit of the control unit in FIG. 3.

As shown in FIGS. 3 and 4, the OCU 32 and the MBU 34 are powered by power subsystems 46 and 66, respectively. The power subsystem 46 for the OCU 32 is shown in FIG. 10 and includes a power supply/logic charger circuit 144 and a battery 146. The battery 146 is shown as a 12 volt, 7 amp-hour (amp-hour is generally defined as the length of operation achievable at a specified current). The power supply/logic charger circuit 144 converts the 12 volt from the battery 146 to different voltages and amperes for the various units. For example, the circuit 144 outputs +12 volt, 4 amps for the monitor 110, fiber optic transceiver 50, and switch controller 138; +5 volts, 2 amps for the microprocessor 80 and switch controller 138; and −5 volts, 100 mA for the switch controller 138. The switch controller 138 is preferably an emitter-coupled logic (ECL) device and uses the +12 volts, +5 volts and −5 volts for power. However, these voltages and currents are exemplary only and other voltages and currents may be used depending on the devices selected.

The power supply/logic charger circuit 144 also receives 120 VAC and 12/24 volt DC. The 120 VAC is used either to charge the battery 146 or to replace the battery 146 by converting the 120 VAC to the required DC voltages as discussed above. The 12/24 volt DC may be supplied from automobiles, for example, to supply the necessary power instead of the battery 146 and 120 VAC. The power supply/logic charger circuit 144 prioritizes the three possible power sources with the 120 VAC having the highest priority and the battery 146 having the lowest priority. For example, if all three power sources are connected, then the 120 VAC would be used. FIG. 10 also shows a keyswitch input which functions to enable/disable the circuit 144.

Figure 15:
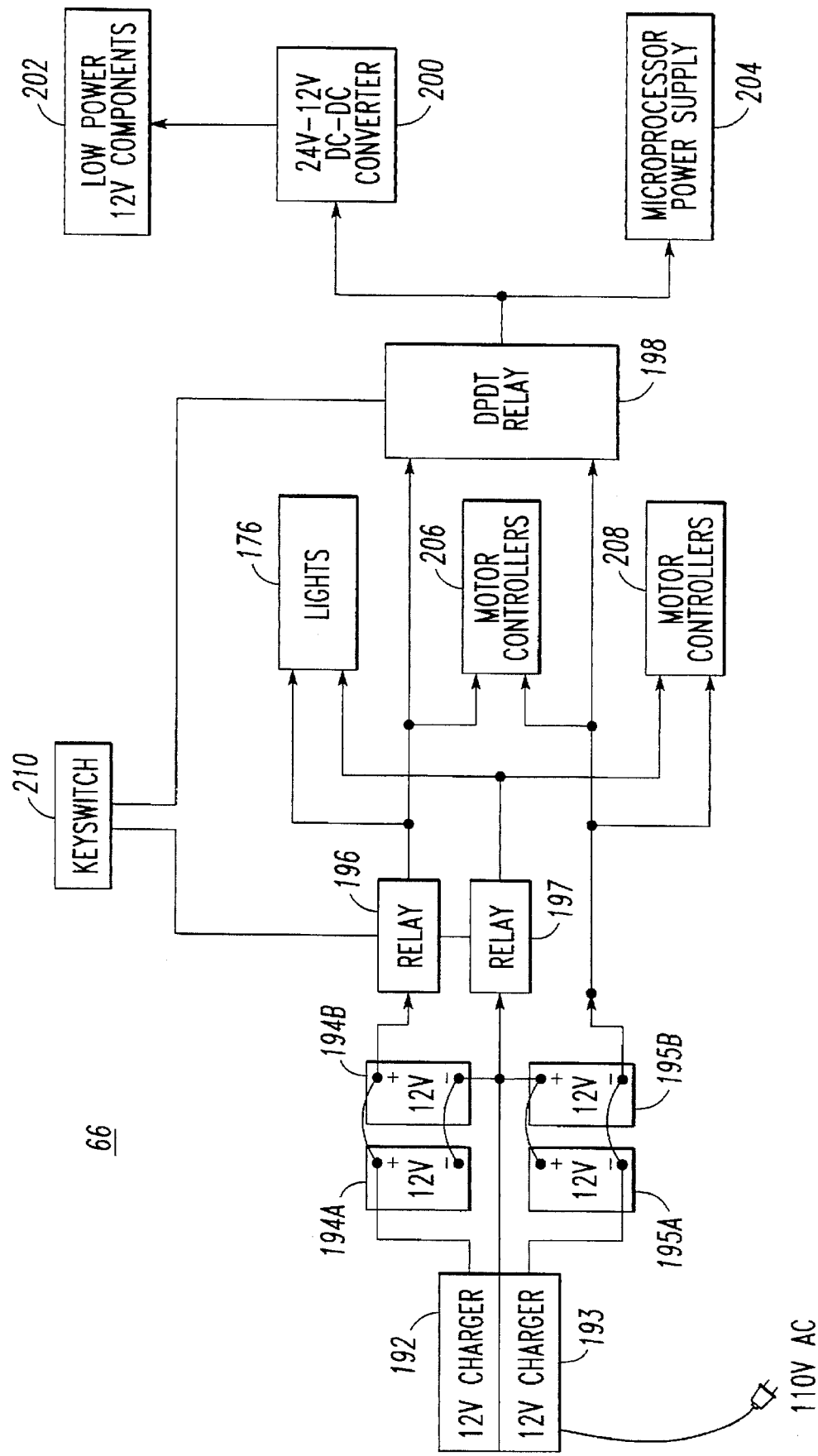
FIG. 15 is a schematic block diagram of a power supply unit of the mobile base unit in FIG. 4.

The power subsystem 66 for the MBU 34 is shown in FIG. 15. The power subsystem 66 includes 12 volt batteries 194A, 194B, 195A and 195B, relays 196 and 197, and double pole, double throw (DPDT) relay 198. The 12 volt batteries are charged by 12 volt battery chargers 192 and 193 using conventional 110 AC volt lines. The battery chargers may be located external or internal to the MBU 34.

The 12 volt batteries 194A, 194B, 195A and 195B are respectively connected to the relays 196 and 197 and the relays 196 and 197 pass the battery voltages to devices such as lights 176, motor controllers (24 volts) 206 (which are labelled as 150, 152, 154 and 156 in FIG. 13), and additional motor controllers (12 volt) 208, as needed. The relays 196 and 197 pass a battery voltage to the DPDT relay 198, which subsequently passes appropriate battery voltage to the microprocessor power supply 204 and a DC-DC converter 200. The DC-DC converter 200 provides a 12 volt regulated voltage to the communication transceivers and the microprocessor power supply 204 converts the 24 V to the required 5 V for the microprocessor 90. The relays 196 and 197 and DPDT relay 198 are enabled/disabled by a keyswitch 210, for example.

As shown in FIG. 17, the OCU 32 is packaged in a small suitcase sized unit where the bottom portion houses all parts of the OCU, except for the flat LCD monitor (not shown in FIG. 17). The LCD monitor is thin enough to be placed at the cover (also not shown) of the small suitcase sized unit. In addition, the low power requirement for this monitor allows operation with a battery weighing less than six pounds. These factors keep the weight of the entire OCU, including battery, at less than 32 pounds, thereby producing a truly portable unit.

Figure 19:
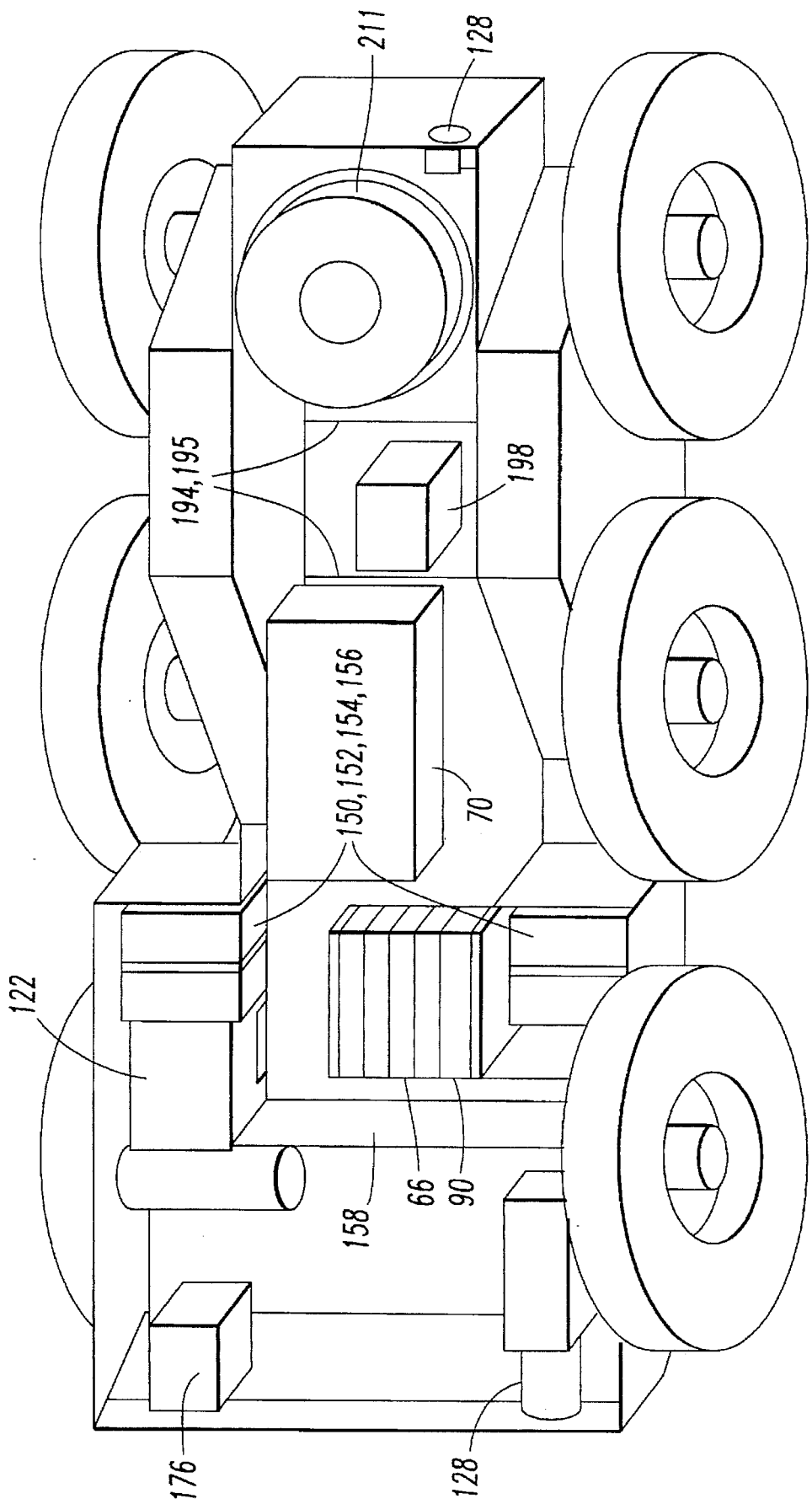
FIG. 19 is an exemplary illustration of a mobile base unit packaging.

The MBU 34 in FIG. 19 shows a land vehicle including six wheels and a fiber optic spool 211 attached at one end of the vehicle. Having the fiber optic spool 211 at the vehicle provides a significant advantage over the fiber optic spool being located at the OCU 32. For example, while the vehicle is moving, the fiber optic cable may get caught. If the fiber optic spool 211 is located at the OCU, then the cable can be broken easily from the pulling force of the vehicle. However, if the fiber optic spool 211 is located at the vehicle, as in the present invention, the spool will continuously feed the fiber optic cable, thereby overcoming potential problems due to a caught cable. Moreover, the spool is designed to feed and rewind the fiber optic cable, as needed. Preferably, feeding and rewinding of the fiber optic cable is controlled by the operator through a spool control.

The control system 30 is software driven. The software drives the OCU 32 through the microprocessor 80 and the MBU 34 through the microprocessor 90. The software in the OCU 32 is similar to the software in the MBU 34. Accordingly, the software for the OCU 32 will be explained.

The software operating the OCU 32 is shown in a flowchart in FIG. 16. When the OCU 32 is turned on, the software performs an initialization routine (step 212). The initialization routine (step 212) performs such functions as setting the LCD graphics display 142 to initialize the status information. After the initialization (step 212), the OCU 32 attempts to establish communication (step 214) with the MBU 34. The OCU 32 will attempt to initiate communications continuously with the MBU 34 until the communication between the OCU and MBU is actually established, which requires the MBU to be turned on, thereby activating the MBU computer (microprocessor 90). Once the communication link has been established, the OCU 32 checks for external inputs (step 216) from the MBU 34. External inputs include, for example, sensor signals (such as battery condition 188, distance meters 190, and position potentiometers 186) from sensor subsystem 64 in the MBU 34. If external inputs are received, the OCU 32 takes action (step 218) corresponding to the external inputs. For example, the OCU 32 displays the sensor signals from the MBU 34 on the LCD graphics display 142. From viewing the LCD video monitor 110 and LCD graphics display (status monitor) 142, the user can decide on the next operation, such as moving the drive joystick 136 to move the MBU 34 to a different position or moving the manipulator joystick 134 to control the arm on the MBU 34.

The OCU 32 senses the operation by checking for such local inputs (step 220) from the operator. Once the local inputs are received, the OCU 32 generates and formats an appropriate message and checksum (step 221) to be transmitted to the MBU 34. Before transmitting the message, however, the OCU 32 checks a timer (step 222) to determined whether an acknowledgment has arrived from the MBU 34 for the last message sent to the MBU 34. If an acknowledgment has not arrived, then the OCU senses an error and interrupts the operation to perform the initialization (step 212). If the MBU 34 detects an error by processing the checksum, a negative acknowledgment is received at the OCU 34 and the message is retransmitted to the MBU 34. If a positive acknowledgment is received within the specified time period, then the timer (such as a software watchdog timer) is reset (step 223) and the newly generated message is transmitted along with a new checksum (step 224). The program repeats from step 216. Steps 222 and 223 may be placed at different steps in the operation. For example, step 222 may be placed at some step above step 216 depending on the time period set for receiving an acknowledgment, and step 223 may be placed after step 224.

Correct transmission of the messages between the OCU 32 and the MBU 34 is ensured by the checksum attached to the message. If the receiving unit verifies the checksum in a message, a positive acknowledgment ("ACK" for example) is sent to the transmitting unit. However, if there is an error in the message, a negative acknowledgment ("NACK" for example) is sent to the transmitting unit. A more accurate acknowledgment scheme may be used which may require additional processing time. For example, when the transmitting unit sends a message, the receiving unit may send back a copy of the received message to the transmitting unit to verify that the correct message was received.

FIGS. 23A to 23E show a detail flowchart of the software used in the control system of the present invention. Again, since the software in the OCU and MBU are similar, the software will be explained with reference to the OCU.

The flowchart shown in FIGS. 23A to 23E corresponds to the program steps in the control system software. Although the program can be written in any language, the flowcharts shown in FIGS. 23A–23E correspond to "C" language.

At the start of the program, all required global header files are specified (step 250). The program calls the main routine (steps 252 and 254) and initializes all local variables used in the main routine (step 256). The video systems in the OCU, including the LCD monitor and the LCD feedback graphics are checked (steps 258 and 262). If there is a failure in any of the video system, the program exits (step 260).

Figure 23A:
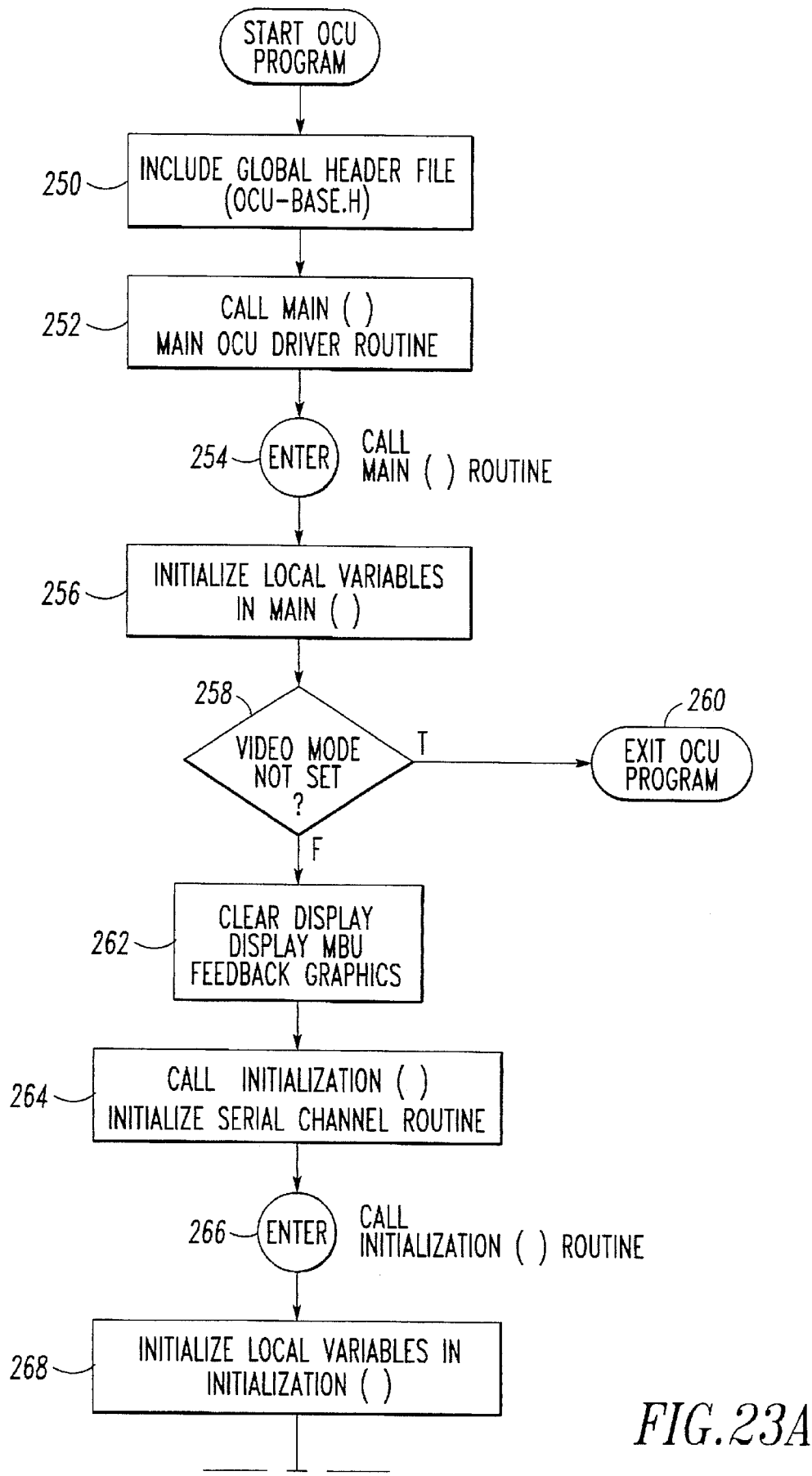
FIGS. 23A–23E are more detailed flowcharts of the steps for operating the control system of the present invention.
Figure 23B:
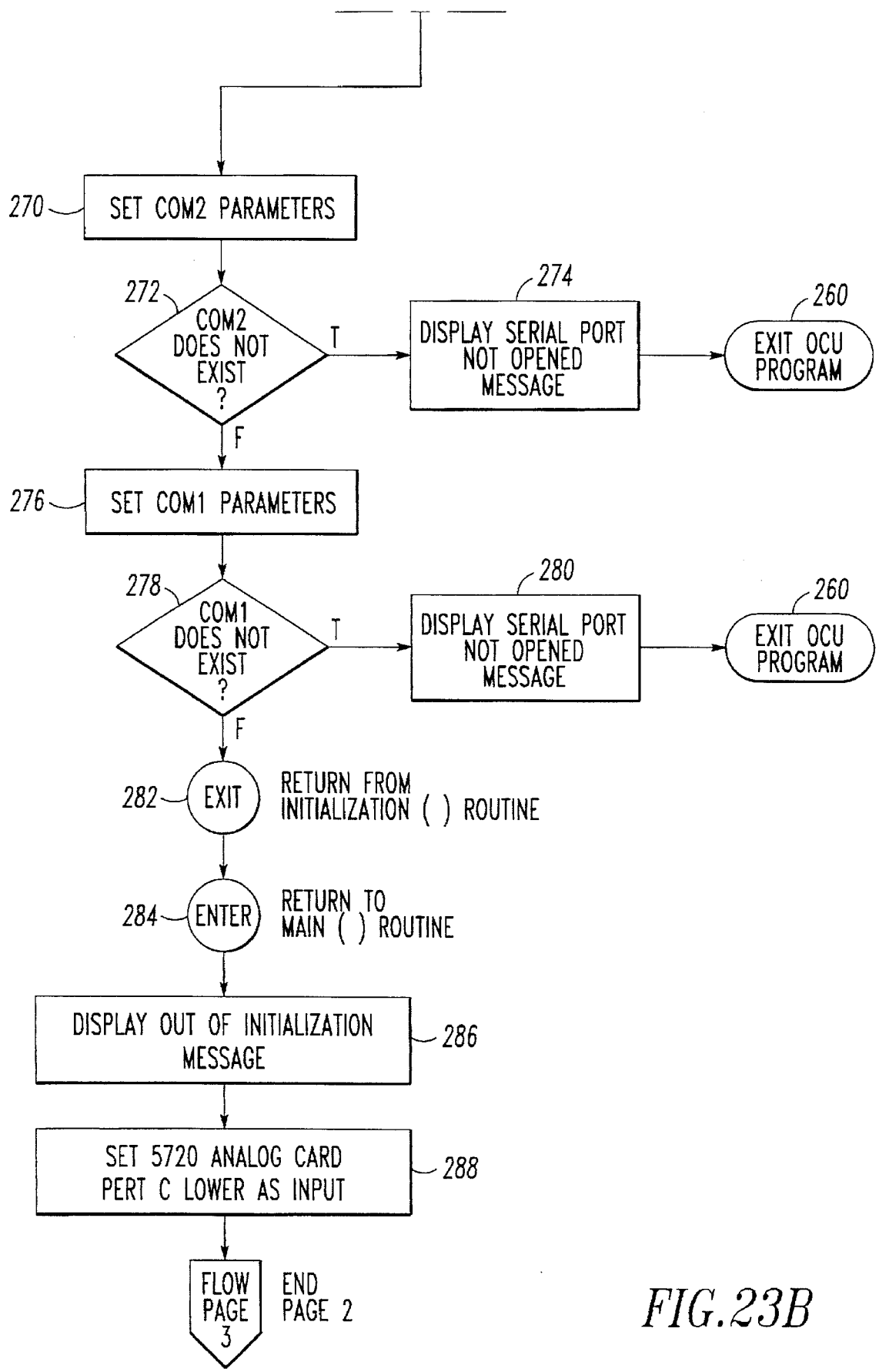

At this point, the program executes an initialization routine (steps 264 and 266) and initializes all local variables for the routine (step 268). As shown in FIG. 23B, during the initialization routine, the serial ports are checked (steps 270, 272, 274, 276, 278, and 280). If any of the serial ports (COM1 and COM2) are not opened, an appropriate message is displayed (steps 274 and 280) and the program exits (step 260). When the initialization routine is completed, the program returns to the main routine and displays an appropriate messages (steps 282, 284 and 286). The main routine checks other devices, such as the analog card for example (step 288).

Figure 23C:
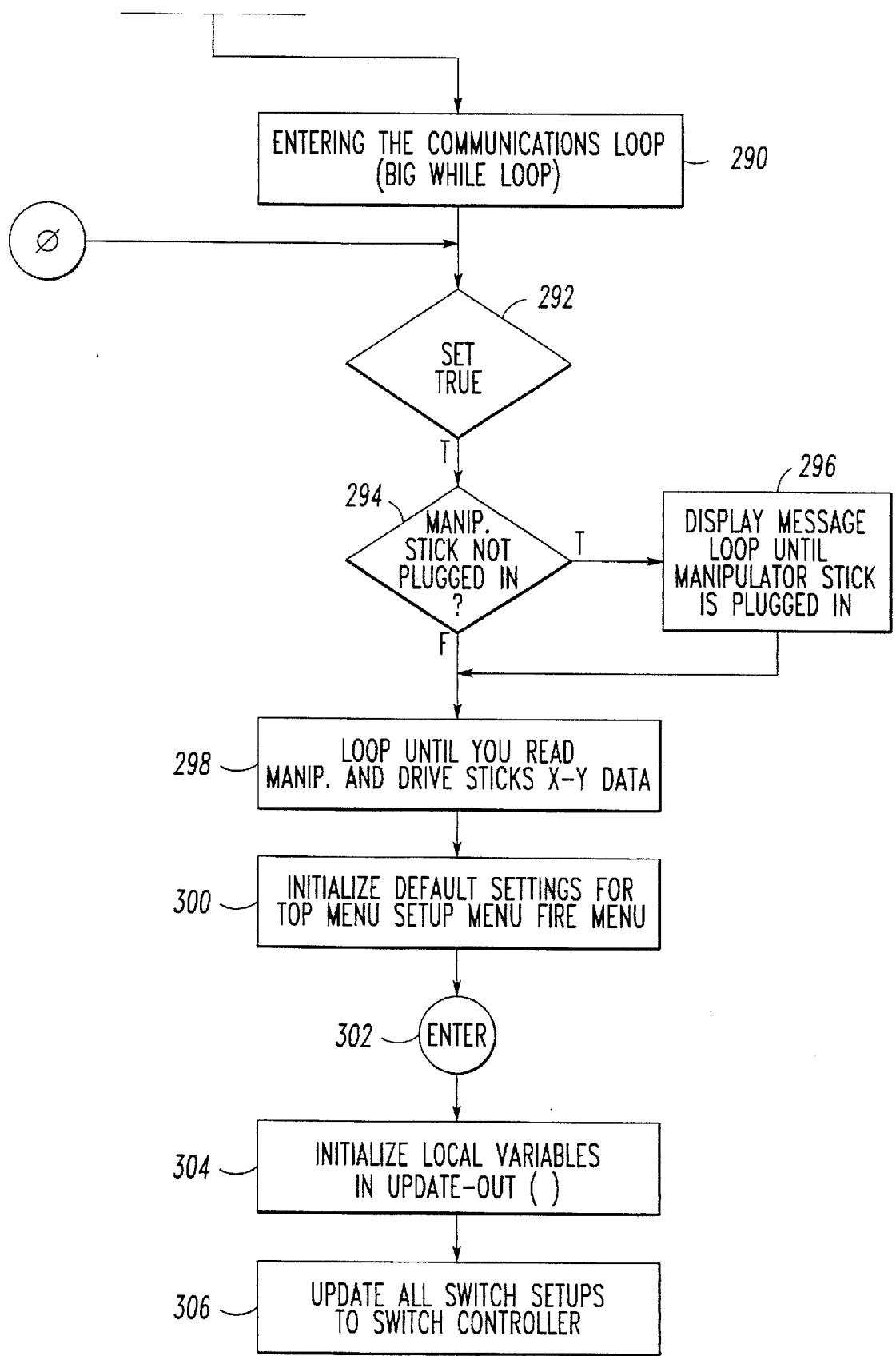
Figure 23D:
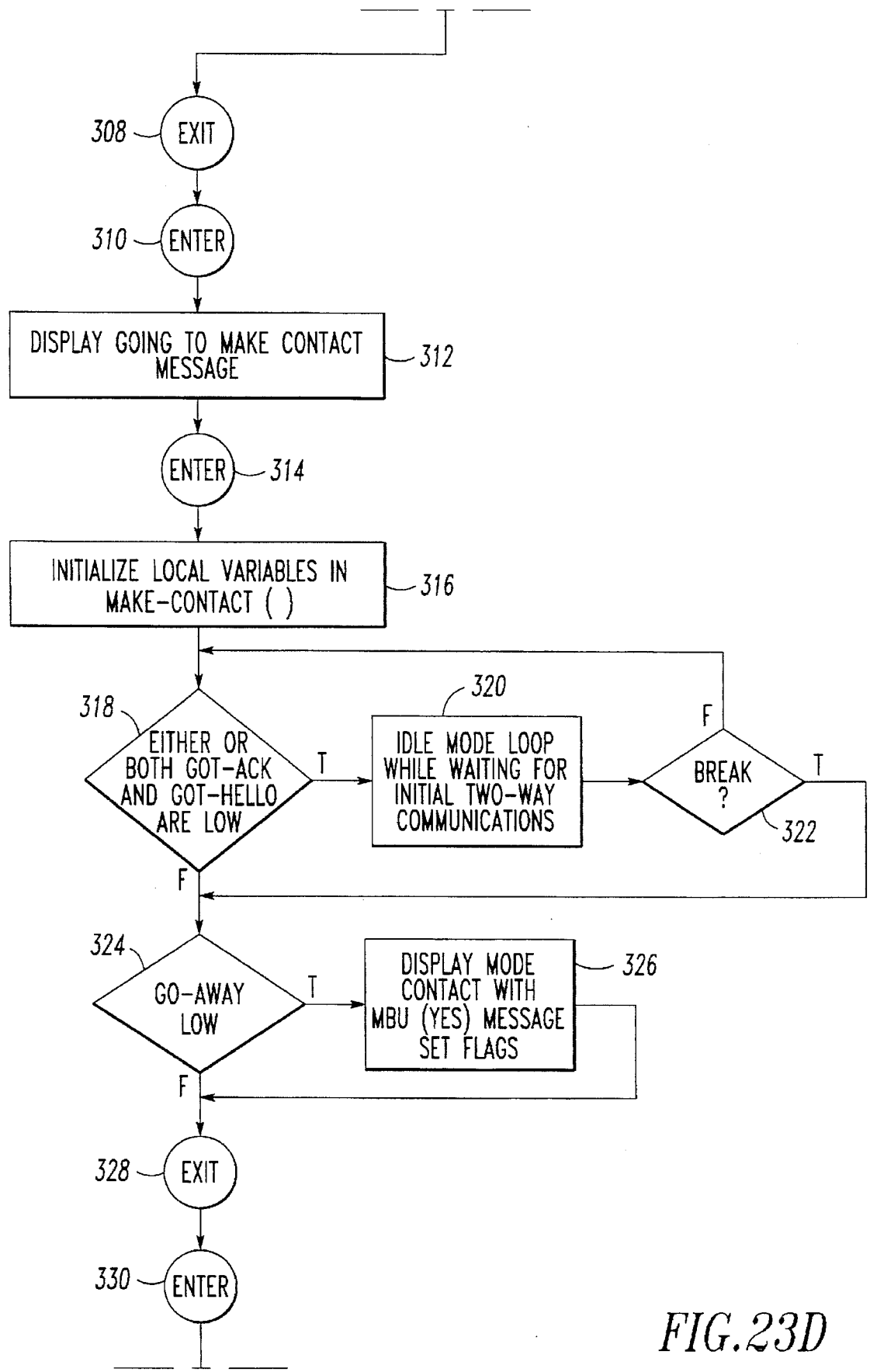

As shown in FIG. 23C, the main routine enters a communication loop (step 290) to test the manipulator joystick and drive joystick (steps 292, 294, 296 and 298). Also, default settings for menus, such as the LCD switches, are initialized (step 300). During the communication loop (step 290), an update routine is executed (step 302) which updates all switch setups to the switch controller (steps 304 and 306). As shown in FIG. 23D, when the update routine is completed, the program returns to the main routine and begins to setup communications between the OCU and the MBU (steps 308, 310 and 312). Accordingly, a contact routine is executed (step 314). In the contact routine, the OCU sends a message to the MBU and waits for a corresponding acknowledgment message from the MBU. When the OCU makes a communication contact with the MBU, then an appropriate message is displayed and the contact routine is exited. This is shown in FIG. 23 as steps 316, 318, 320, 322, 324, 326 and 328.

Figure 23E:
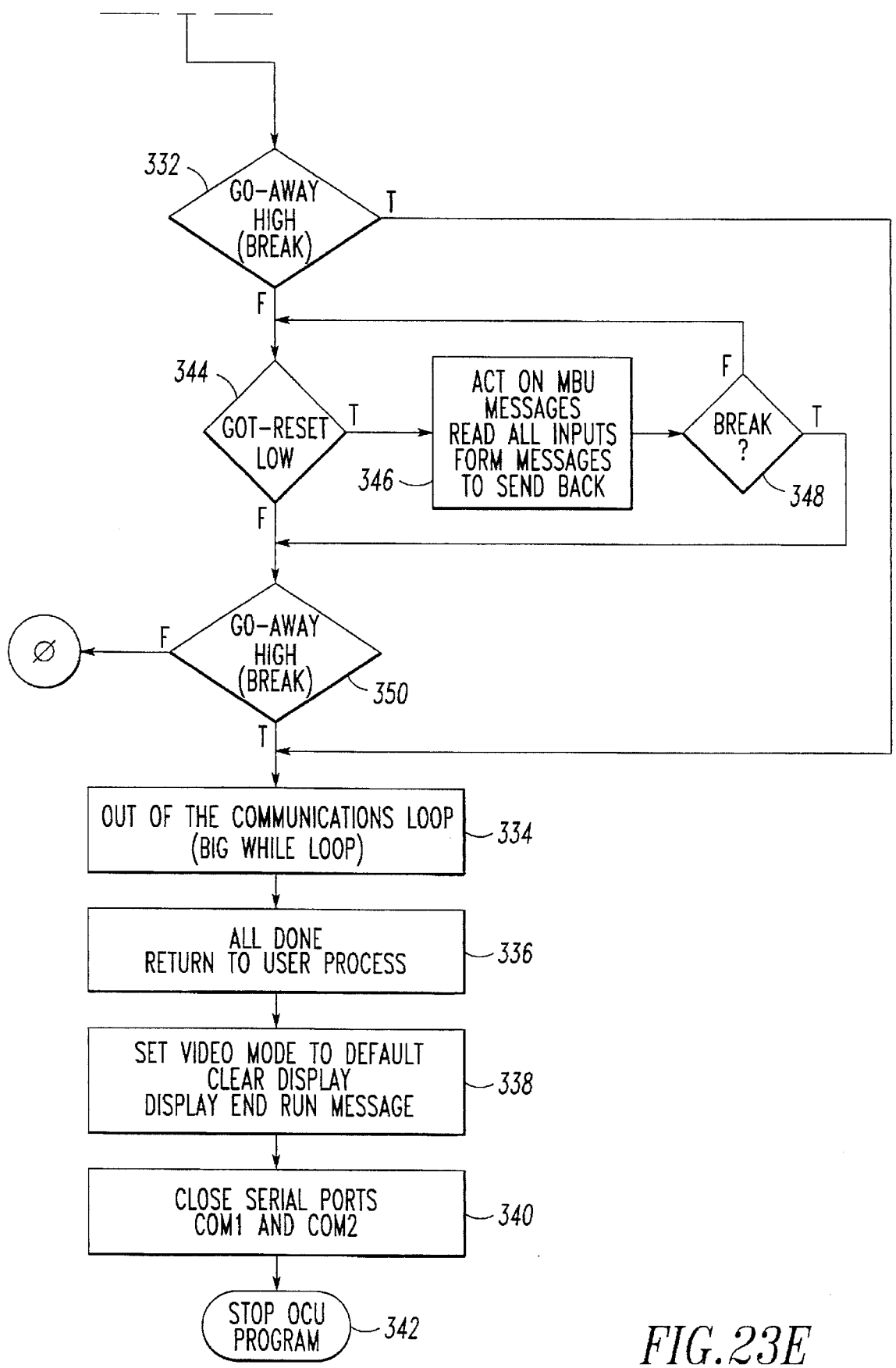

At this point, the OCU has performed all initialization routines and has established communications with the MBU (this was also explained with reference to steps 220 and 214 in FIG. 16). FIG. 23E shows the main part of the program that allows the OCU and MBU to exchange information to perform desired tasks. During the main part, an operator can manually exit the program without turning off the system (step 332). If the operator does exit the program in step 332, than the program goes out of the communication loop and the program is stopped (Steps 344, 346, 348 and 350). Otherwise, the program executes steps 334, 336, 338, 340 and 342, which generally correspond to steps 216, 218, 220, 221, 222, 223 and 224 in FIG. 16.

Figure 21:
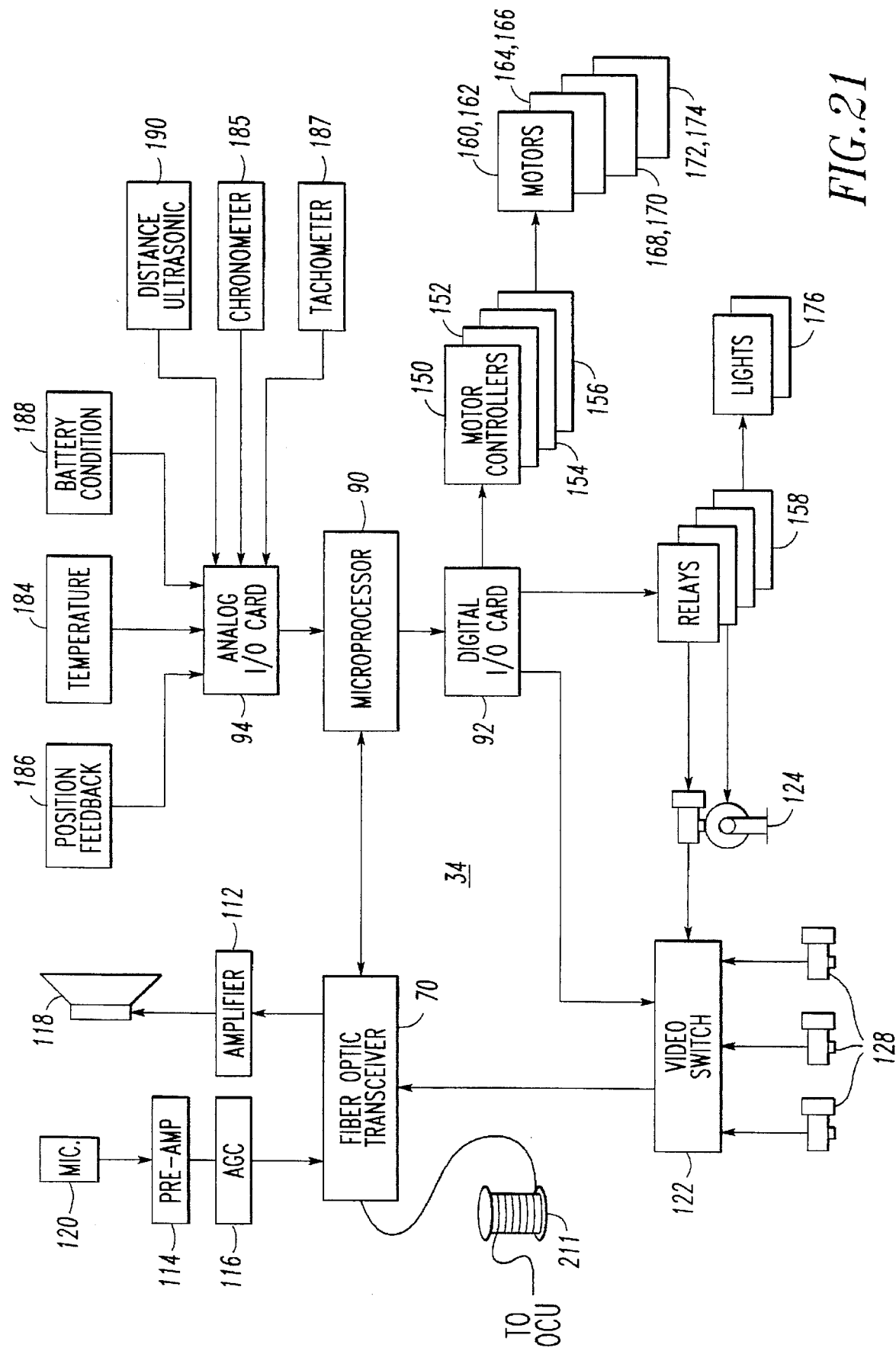
FIG. 21 is a more detailed schematic diagram of the mobile base unit.
Figure 22:
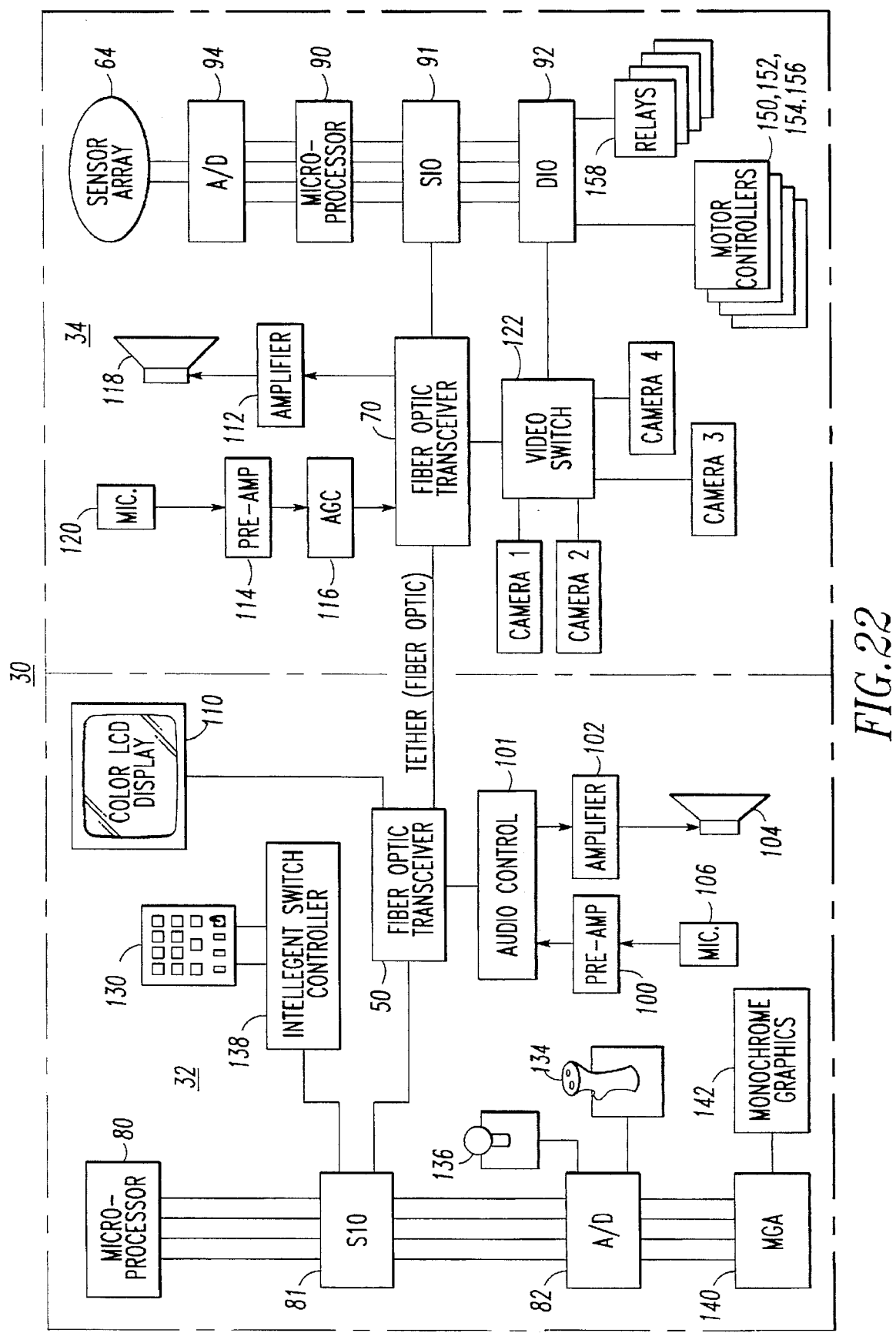
FIG. 22 is a more detailed schematic diagram of the control system including the operator control unit and the mobile base unit.

Now the operation of the control system of the present invention will be explained with reference to FIGS. 20 and 21. FIG. 22 shows the entire control system 30, which combines FIGS. 20 and 21, and additionally shows serial input/output ports 81 and 91, which are computer interface cards for the serial communication.

Figure 20:
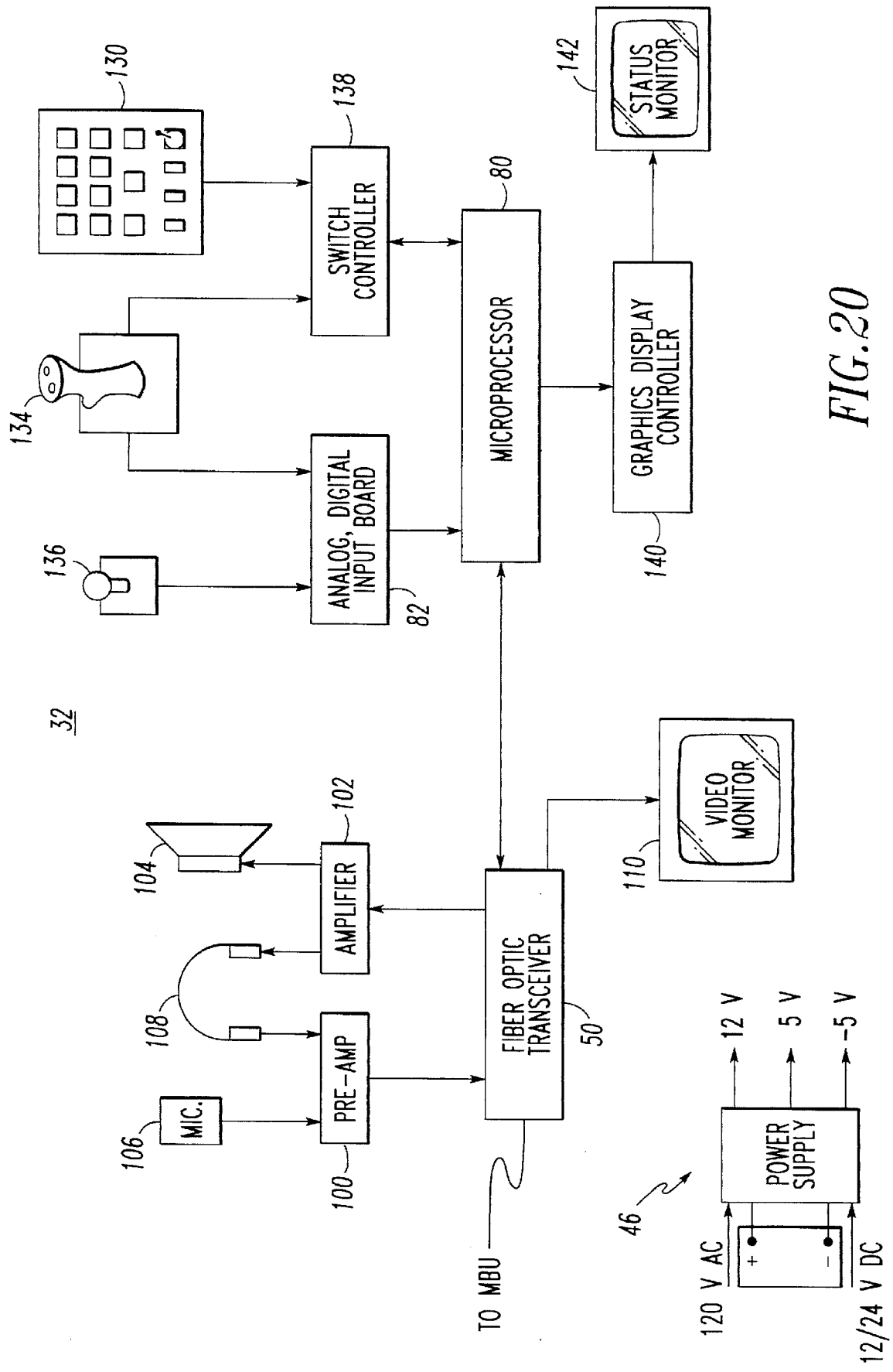
FIG. 20 is a more detailed schematic diagram of the operator control unit.

Referring to FIG. 20, the drive joystick 136 controls the vehicle movement of the MBU 34. When an operator wants to move the MBU 34 to a desired location, the operator uses the video monitor 110 to view the surrounding areas of the MBU 34. Using the drive joystick 136, the operator moves the joystick 136 in the direction the operator wants the vehicle (MBU) to proceed. When this happens, a corresponding analog signal is sent to the analog and digital input board 82. The analog input board 82 converts the analog signal to a digital signal and transmits the digital signal to the microprocessor 80. The microprocessor 80 transmits the digital signal as a drive motor signal to the fiber optic transceiver 50 of the OCU 32. The transceiver 50 subsequently sends the drive motor signal through the fiber optic cable to the fiber optic transceiver 70 at the MBU 34, as shown in FIG. 21. The fiber optic transceiver 70 sends the drive motor signal to the microprocessor 90. The microprocessor 90 subsequently sends the drive motor (digital) signal to the digital I/O card 92. The digital I/O card 92 sends a corresponding drive motor signal to the motor controller 150 and the motor controller 150 sends an appropriate command to drive the motors 160 and 162, which correspond to left and right drive motors, respectively.

When the OCU 32 sends a command signal to the MBU 34 through the fiber optic transceiver, the microprocessor 90 in the MBU 34 receives the message and processes the checksum in the message and immediately sends an acknowledgment signal back to the microprocessor 80 in the OCU 32. This acknowledgment signal assures the OCU 32 that the communication link between the OCU 32 and the MBU 34 is working properly.

When the MBU 34 responds to the command signal and performs an operation, such as moving any part of the arm—turret, elbow, shoulder, gripper, left wrist and right wrist (see FIGS. 9 and 13) —the position sensors 186 sense the change in the position of the arm. The position sensors 186 send a corresponding signal to the microprocessor 90 through the analog input card 94. The microprocessor 90 subsequently transmits a message to the microprocessor 80 in the OCU 32 updating the new position, as shown in FIG. 20. The microprocessor 80 in the OCU 32 sends a corresponding signal to the LCD graphics display (status monitor) 142 through the graphics display controller 140.

Similar to the acknowledgments sent from the MBU 34 to the OCU 32, the microprocessor 80 in the OCU 32 sends an acknowledgment back to the MBU 34 once it receives the message from the MBU 34, as just explained above.

A similar process occurs for all other commands from the OCU 32 to the MBU 34 and for all other sense signals from the MBU 34 to the OCU 32, as explained with reference to the software flowchart in FIG. 16.

Accordingly, the present invention provides a control system with high modularity. Due to the modularity of the OCU in the present invention, a different control input with, for example, up to two analog and eight digital controls can be substituted with no internal OCU modifications. For example, this modularity allows the manipulator joystick to be removed from the OCU and used as a walk-behind controller when loading and unloading a ground vehicle.

Also, the present invention utilizes a small monochrome LCD to display feedback information from the vehicle and other status information. The information displayed is system dependent, with the software again being the only change required for different systems. Communication between the OCU and the MBU are performed on a serial data link which is adaptable to fiber optic, radio frequency or hardwire (coax) transmission. The software in the system can be modified utilizing this same link. This allows field updates to be made without disassembling the system.

Other modifications may be made to the present invention. An image recognition system can be installed in the control system for surveillance applications, for example. This may require additional microprocessors to meet higher data processing requirements. Also, the ground vehicle may be replaced by an air or sea vehicle. To accommodate the air or sea vehicle, the controls to operate the ground vehicle, as in the MBU, would be replaced by controls needed to operate the air or sea vehicle.

It will be apparent to those skilled in the art that various modifications and variations can be made in the control system of the present invention without departing from the spirit or scope of the invention. Thus it is intended that the present invention cover the modifications and variations of this invention provided they come within the scope of the appended claims and their equivalents.

What is claimed is:

1. A remote control system, comprising:

an unmanned vehicle;

a hand portable operator control unit for controlling said unmanned vehicle and being located apart therefrom, said control unit being packaged in a relatively small light weight suitcase sized storage unit including a bottom storage portion and a cover therefor;

a user input subsystem in said operator control unit including a plurality of liquid crystal display switches for generating user commands, said switches including a plurality of switches for sending the user commands to the unmanned vehicle, a plurality of camera control switches for sending camera commands to the unmanned vehicle, said user input subsystem further including, switch controller for receiving the user commands, camera commands, and motor commands and sending appropriate commands to the unmanned vehicle, a vehicle speed and direction controller for controlling movements of the unmanned vehicle, a control subsystem responsive to the commands from the user input subsystem including a first control subsystem for the operator control unit and a second control subsystem for the unmanned vehicle, the first and second control subsystems respectively including a first and a second microprocessor having means for bidirectionally transmitting and receiving information via a communication subsystem, said first microprocessor further including means for reconfiguring selected ones of said plurality of liquid crystal display switches so as to display different legends and control different devices;

said communication subsystem including first and second communications units coupled to the first and second microprocessors for exchanging information between the portable operator control unit and the unmanned vehicle, said first communications unit further including a video subsystem including a flat liquid crystal display (LCD) video monitor located on said cover of the storage unit for displaying an area in the vicinity of the unmanned vehicle, including connections for a portable battery, coupled to means for receiving video signals from at least one video camera located on the unmanned vehicle;

an actuator subsystem in the unmanned vehicle coupled to the second microprocessor of the second control subsystem for controlling a set of vehicle drive motors in response to control signals from the control subsystem;

a sensor subsystem coupled to the first microprocessor of the first control subsystem for providing sensor information generated at the unmanned vehicle to the control subsystem;

a feedback display subsystem including a liquid crystal display (LCD) status display located in said bottom storage portion of the storage unit and a controller coupled to the control subsystem for displaying said sensor information on said status display; and, a power supply unit for providing power to the control system and including said portable battery.

2. The control system according to claim 1, wherein the first communication unit comprises:

a data link for sending and receiving the information from the remote unit, the information including video and audio signals; and an audio unit coupled to the data link for sending and receiving audio signals from the remote unit.

3. The control system according to claim 2, wherein the data link is one of a fiber optic transceiver, a radio frequency transceiver, and a hardwire transceiver.

4. The control system according to claim 1, wherein the second communication unit comprises:

a data link for sending and receiving the information from the operator control unit, the information including video and audio signals;

a video unit coupled to the data link for sending and receiving the video signals from the operator control unit; and an audio unit coupled to the data link for sending and receiving audio signals from the operator control unit.

5. The control system according to claim 4, wherein the data link is one of a fiber optic transceiver, a radio frequency transceiver, and a hardwire transceiver.

6. The control system according to claim 4, wherein the video unit includes:

a video switch coupled to the data link and receiving commands from the first control subsystem; and wherein said at least one video camera comprises a plurality of cameras coupled to the video switch and receiving camera commands from the first control subsystem.

7. The control system according to claim 4, wherein the audio unit includes connections for a microphone and a speaker.

8. The control system according to claim 1, wherein the camera control switches control camera positions at the remote unit and additional camera controls including zoom, iris, and focus lens.

9. The control system according to claim 1, wherein the vehicle speed and direction controller includes a joystick.

10. The control system according to claim 1, wherein the actuator subsystem comprises a relay unit for transferring the user commands from the control subsystem to various functions of the remote unit.

11. The control system according to claim 10, wherein the various functions include lights, video switch, pan and tilt unit for cameras, and camera functions including zoom, iris, and focus lens.

12. The control system according to claim 1, wherein the sensor subsystem comprises an analog input unit for receiving inputs from various status sensors.

13. The control system according to claim 12, wherein the status sensors include position sensors for sensing positions of movable parts on the remote unit, distance meters for sensing a distance between an object and the remote unit, and battery voltmeters and condition sensors.

14. The control system according to claim 12, wherein the status sensors include a tachometer and a chronometer on the remote unit.

15. The control system according to claim 12, wherein the status sensors include a thermometer to sense temperature at the remote unit.

16. The remote control system according to claim 1, wherein said unmanned vehicle comprises a mobile ground vehicle.

17. The remote control system according to claim 1 wherein said video monitor comprises a color LCD monitor.

18. A remote control system, comprising:

an unmanned vehicle having a manipulator located thereon;

a hand portable operator control unit for controlling said unmanned vehicle and said manipulator and being located apart therefrom, said control unit being packaged in a relatively small, light weight suitcase sized storage unit including a bottom storage portion and a cover thereof;

a user input subsystem in said operator control unit including a plurality of liquid crystal display switches for generating user commands, said switches including a plurality of switches for sending the user commands to the unmanned vehicle, a plurality of camera control switches for sending camera commands to the unmanned vehicle, a plurality of manipulator switches for sending motor commands to the unmanned vehicle, said user input subsystem further including, switch controller for receiving the user commands, camera commands, and the motor commands and sending appropriate commands to the unmanned vehicle, a vehicle speed and direction controller for controlling movements of the unmanned vehicle, and a manipulator controller for controlling movements of said manipulator;

a control subsystem responsive to the commands from the user input subsystem including a first control subsystem for the operator control unit and a second control subsystem for the unmanned vehicle, the first and second control subsystems respectively including a first and a second microprocessor having means for bidirectionally transmitting and receiving information via a communication subsystem, said first microprocessor further including means for reconfiguring selected ones of said plurality of liquid crystal display switches so as to display different legends and control different devices;

said communication subsystem including first and second communications units coupled to the first and second microprocessors for exchanging information between the portable operator control unit and the unmanned vehicle, said first communications unit further including a video subsystem including a flat liquid crystal display (LCD) video monitor located on said cover of the storage unit for displaying an area in the vicinity of the unmanned vehicle, including connections for a portable battery, coupled to means for receiving video signals from at least one video camera located on the unmanned vehicle;

an actuator subsystem in the unmanned vehicle coupled to the second microprocessor of the second control subsystem for controlling a set of vehicle drive motors and a set of manipulator drive motors in response to control signals from the control subsystem;

a sensor subsystem coupled to the first microprocessor of the first control subsystem for providing sensor information generated at the unmanned vehicle to the control subsystem;

a feedback display subsystem including a liquid crystal display (LCD) status display located in said bottom storage portion of the storage unit and a controller coupled to the control subsystem for displaying said sensor information on said status display; and, a power supply unit for providing power to the control system and including said portable battery.

19. The control system according to claim 18, wherein the manipulator controller includes a joystick.

20. The remote control system according to claim 18 wherein said plurality of manipulator switches are mounted on a manipulator joystick located on the storage unit.

21. The remote control system according to claim 20 wherein said manipulator joystick is located in said bottom storage portion of said storage unit.

22. The remote control system according to claim 21 wherein said manipulator joystick is removable from said storage unit for use as a walk-behind controller.

23. The remote control system according to claim 18 wherein said unmanned vehicle comprises a mobile ground vehicle.

24. The remote control system according to claim 18 wherein said video monitor comprises a color LCD monitor.

* * * * *